United States Patent [19]
Heit et al.

[11] Patent Number: 5,613,591
[45] Date of Patent: Mar. 25, 1997

[54] SORTATION CONVEYOR AND DEVICES

[75] Inventors: Martin A. Heit, Cincinnati, Ohio; Timothy A. Koeninger, Fort Thomas; John E. O'Brien, Florence, both of Ky.; John J. Wilkins, Cincinnati, Ohio; Randall P. Coons, Crescent Springs, Ky.

[73] Assignee: Litton Industrial Automation Systems, Inc., Del.

[21] Appl. No.: 973,669

[22] Filed: Nov. 9, 1992

[51] Int. Cl.$^6$ .................................................. B65G 47/34
[52] U.S. Cl. .................................................. 198/370.02
[58] Field of Search ......................... 198/370.02, 370.03, 198/440

[56] References Cited

U.S. PATENT DOCUMENTS

| | | | |
|---|---|---|---|
| 3,987,888 | 10/1976 | Wickam ................................ | 198/440 X |
| 4,717,011 | 1/1988 | Yu et al. ................................ | 198/365 |
| 4,884,677 | 12/1989 | Yu et al. ................................ | 198/365 X |
| 4,941,561 | 7/1990 | Yamabe et al. ........................ | 198/365 |
| 4,984,675 | 1/1991 | Yamabe et al. ........................ | 198/365 |
| 5,027,939 | 7/1991 | Kilper et al. ........................... | 198/365 |
| 5,127,510 | 7/1992 | Cotter et al. ........................... | 198/440 X |
| 5,135,100 | 8/1992 | Cotter et al. ........................... | 198/372 X |
| 5,217,103 | 6/1993 | Umlauf .................................. | 198/365 |

FOREIGN PATENT DOCUMENTS

| | | | |
|---|---|---|---|
| 0507413 | 10/1992 | European Pat. Off. ................ | 198/372 |
| 2912298 | 12/1979 | Germany ............................... | 198/440 |
| 0026605 | 2/1991 | Japan .................................... | 198/365 |

*Primary Examiner*—James R. Bidwell
*Attorney, Agent, or Firm*—Morris I. Pollack

[57] ABSTRACT

A linear actuator divert switch, a limited angle motor driven divert switch and a limited angle motor driven cross-over switch are provided for sortation conveyors. In addition conveying members of inverted substantially "U" shaped having spaced relatively hollow legs spanned by a bridge that is either hollow or not are also provided for sortation conveyors. A package diverter is formed with a cavity extending therethrough to surround the conveying member and so as to carry a divert/guide pin and cam follower part of which is disposed in the space between the conveying member legs to provide a relatively high positioning for divert/guide pin and cam follower with respect to the conveying members. Special lands extend out from the walls of the cavity to cock each package diverter on its conveying members in the direction of conveyor movement. The divert/guide pins are formed with a generally football shaped cross-sectional configuration to facilitate passage thereof through the various switches.

76 Claims, 9 Drawing Sheets

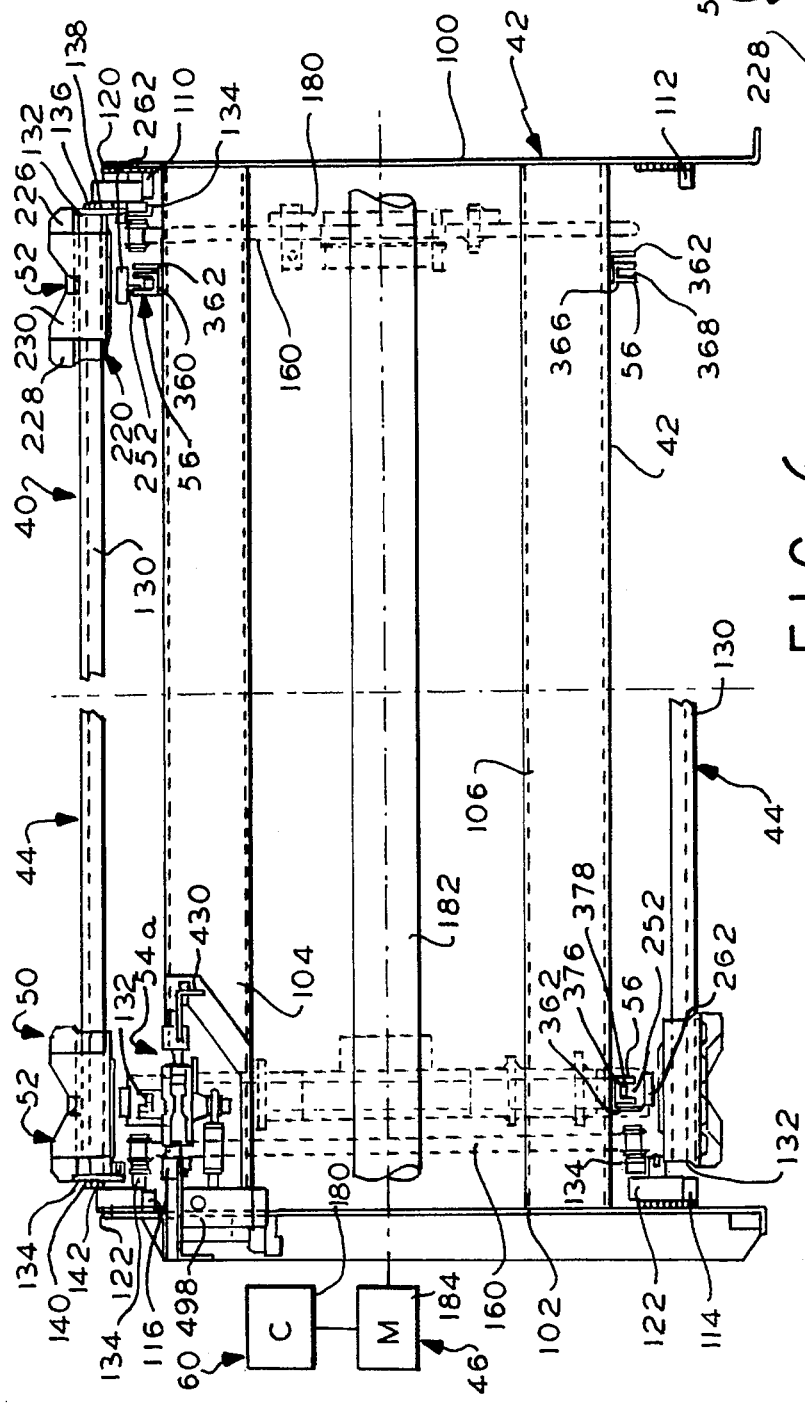
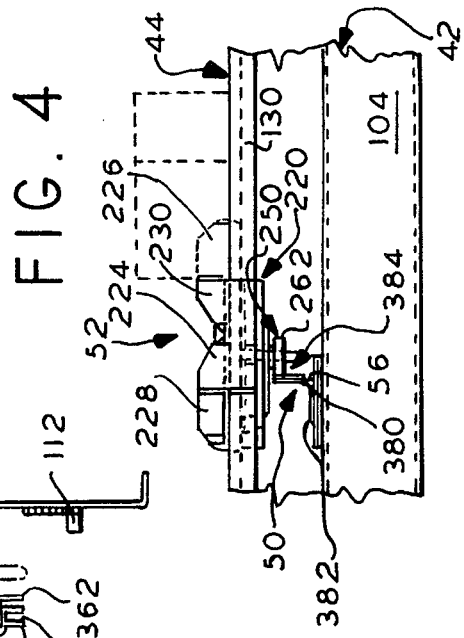
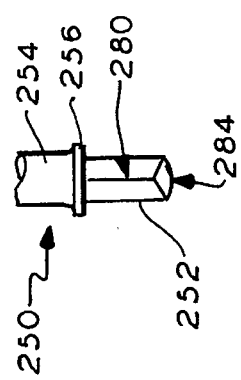

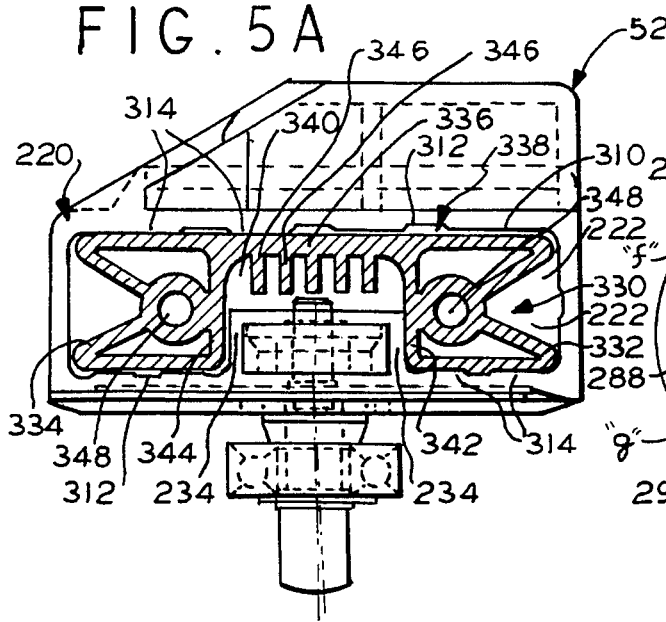
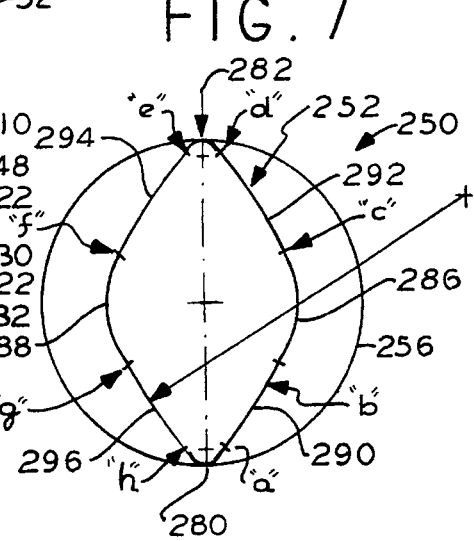
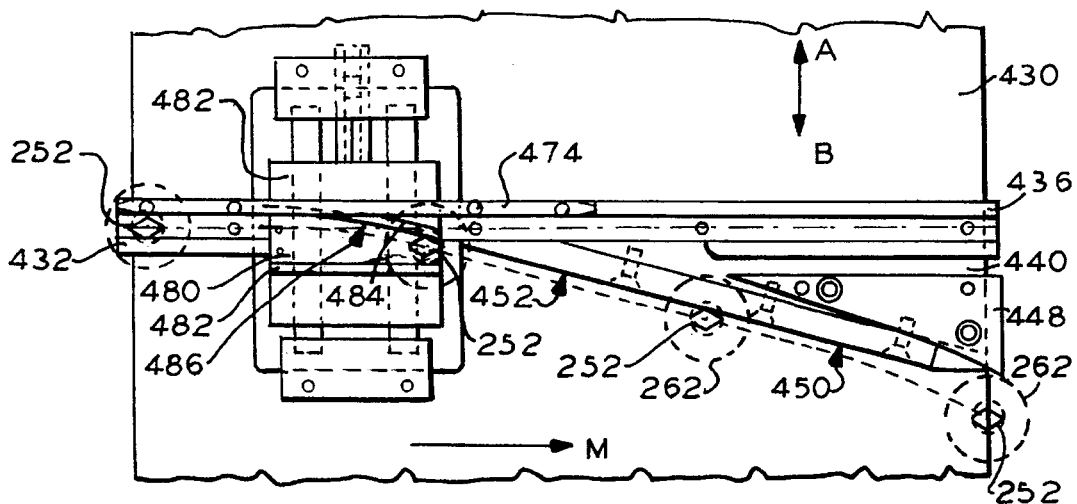
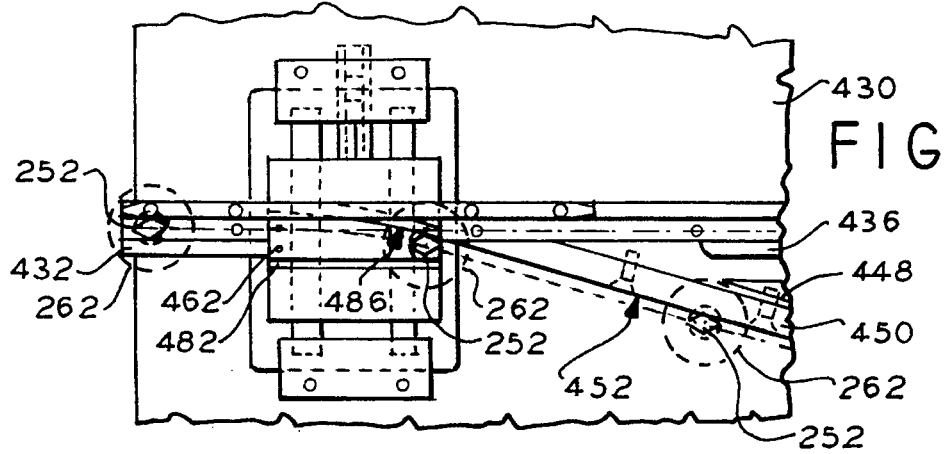

SORTATION CONVEYOR AND DEVICES

BACKGROUND OF THE INVENTION—FIELD OF APPLICATION

This invention relates to conveyors; and more particularly to sortation conveyors and devices and mechanisms utilized in sortation conveyors.

BACKGROUND OF THE INVENTION—DESCRIPTION OF THE PRIOR ART

Sortation conveyors are utilized to convey packages (bags, parcels, boxes, and the like) from storage, manufacture, depalletizing and similar operations to one or more other locations where another operation may be performed in respect of the package and/or its contents. Such other operation may include loading, unloading, palletizing, storage or assembly of packages for particular orders at particular loading dock stations or locations.

In general, sortation conveyors include a plurality of conveying members, which may be slats or hollow tubes with round or rectangular cross-sections, that are connected together and moved along a frame in an endless loop to provide on top of the frame a conveying bed or apron to move packages along a main path from an entry end of the conveyor to an exit end of the conveyor. A number of spur or divert secondary conveyors extend from the sortation conveyor each to a selected different location and form with the sortation conveyor a sortation system. In some conveyor configurations packages that are to be routed off of the main conveyor and into a secondary path by a spur or divert conveyor are intercepted by one or more pushers or diverters that urge the package to move sideways, on the main conveyor apron or bed, and onto a particular spur or divert conveyor. The number of pushers usually required for a particular package depends upon the size of the package to be so moved; with the movement of selected pusher(s) into position for coaction with a particular package often effected by control and switching devices.

Sortation conveyors of the type hereinabove discussed are shown and described, by way of example: in U.S. Pat. No. 4,738,347 issued on Apr. 19, 1988 to G. A. Brouwer et al for "Diverter Shoe And Diverting Rail; in U.S. Pat. No. 5,127,510 issued on Jul. 7, 1992 to D. H. Cotter, et al for "Modular Diverter Shoe And Slat Construction;" and in a publication number MO1-102 titled "TRANSORT high speed sortation conveyor from Litton." In the Litton conveyor the conveying members comprise a plurality of cylindrical tubes each of circular cross section, with pairs of adjacent tubes carrying pushers to divert packages from the main conveyor to sort lanes. The Brouwer et al sortation conveyor mounts each of its package diverters on three adjacent cylindrical tubes (each of circular cross-section) of its article transport surface; while for the Cotter et al sortation conveyor a diverter shoe is carried by each one of the hollow tubular slats (each of rectangular, parallelogram, cross-section) that comprise the conveying surface.

In each of the three sortation conveyors described above the package pushers or diverters each carry a depending diverter pin and a guide wheel that cooperate respectively and in conventional manner with tracks and/or guide rails disposed beneath the respective conveyor beds. Those guide rails or tracks include main guides that extend along one side or the other (or both) of the main conveyor path; with coaction between such main guide(s) and either the diverter pins or guide wheels of the pushers confining the pushers for movement along the respective side, or sides, of the conveyor as the conveying members move from the entry to the exit end of the conveyor. Diverter guides or tracks extend away from the main guides or tracks at an angle beneath and across the conveyor bed in advance of and in proximity to each location where there is a spur or secondary conveyor, and divert switches are disposed at each intersection of the main guide track with a divert guide track. Disposition of a switch in a "through" configuration confines the pusher pin and guide wheel to movement in proximity to the main guide track but actuation of a switch into a "divert" disposition induces each pin and guide wheel thereafter entering the switch while so disposed to detour from the main track. Continued movement of the conveying members and coaction of the guide wheels carried by such conveying members with the divert track effects a movement of the so diverted pushers laterally across the conveying members and into coaction with a package to urge the package off of the main conveyor path and onto a secondary conveyor path. Suitable timing and control devices effect operation of the respective divert switches to divert a number of pushers, commensurate with the size of the packages to be diverted. Return guide tracks, disposed proximate the conveying members while moving through a return path, guide the respective pushers and their pins and guide wheels back into the main guide track for continued re-use.

It should, however, be noted that such prior-art sortation conveyors as described above utilize divert switches operated by pneumatic cylinders the inherent construction of which limits the speed at which package diverts or sorts can be made and as such may prove unacceptable where relatively high-speed package sortation is needed. In addition continuous operation of such prior-art pneumatic cylinder operated divert switches may generate noise levels that are unacceptable by current standards and result in excessive wear, downtime and replacement expense. Moreover, the article pusher portions of the pushers of these prior-art sortation systems are all multiple part units that are assembled together by threaded fasteners or snap fits and, as such, may separate in use and possibly damage the conveyor, packages, or both as well as being unavailable for future use thus resulting in downtime while they are replaced. Furthermore, the divert pins of some of these prior-art sortation devices, especially ones such as shown and described in the above referred to Cotter, et al U.S. Pat. No. 5,127,510, all extend a significant distance beneath their respective pushers and, as such and upon coaction of their divert pins with the divert switches, could create undesirable moment forces tending to rotate their pushers about their conveying members.

U.S. Pat. No. 3,987,888 issued on Oct. 26, 1976 to I. E. Wickam for Sorting Switch and U.S. Pat. No. 4,508,206 issued on Apr. 2, 1985 to J. W. Moore, et al for "Conveyor And Sorting Switch" show further examples of such unacceptable pneumatic cylinder controlled switches but used instead with either pairs of spaced tubular conveying members or with inverted "U" channel conveying members.

U.S. Pat. No. 5,038,912 issued on Aug. 13, 1991 to D. H. Cotter for "Vertically Actuated Transfer Switch" provides a solenoid and spring actuated divert switch for a sortation conveyor. However, accumulated dirt and oils may interfere with and slow down continuous operation of solenoids or magnetic coils so used and springs may fatigue and may otherwise prove unreliable to operate divert switches for the speed of diverts and sorts required by current sortation conveyors.

Some prior-art sortation conveyors, as shown and described by way of example, in U.S. Pat. No. 4,717,011 issued on Jan. 5, 1988 to T. C. Yu et al for "Sorting Conveyor With Cross-Over" and in U.S. Pat. No. 5,135,100 issued on Aug. 4, 1992 to D. H. Cotter et al for "Track Intersection Pin Guide" require spur conveyors directly opposite and to each side of the main conveyor path and as such their divert guide tracks intersect. These prior-art sortation conveyors provide cross-over switches where the guide tracks intersect to facilitate movement of the divert pins, guide wheels and pushers in an unhindered manner to effect movement of the package onto the proper spur. But, the T. C. Yu et al construction utilizes relatively complex pneumatic cylinder actuated devices for operation of its cross-over switch and that may prove unacceptable for reasons discussed hereinabove with respect to other prior-art pneumatic cylinder operated switch constructions. Alternatively, the Cotter et al construction requires its guide wheels to impact against and operate its relatively complex cross-over switch. This action generates unacceptable impact forces and noise while detouring into switch operation energy that could otherwise be more efficiently utilized to convey packages. The T. C. Yu et al construction, furthermore, provides an upwardly/downwardly movable, spring biased and pivotally mounted block to facilitate release of a hung-up pusher guide wheel, and its pusher, at the cross-over intersection; thus significantly adding to the size, weight, complexity, and cost of the cross-over switch.

SUMMARY OF THE INVENTION

It is therefore an object of this invention to provide new and novel conveyors.

It is another object of this invention to provide new and novel sortation conveyors.

It is yet another object of this invention to provide new and novel sortation conveyors that can effectively sort at relatively high speeds.

It is still another object of this invention to provide new and novel sortation conveyors that can effectively sort to either side as well as to directly opposite spur conveyors at relatively high speeds.

It is yet another object of this invention to provide new and novel devices for sortation conveyors.

It is yet still another object of this invention to provide new and novel sortation conveyors that minimize component noise while sorting at relatively high speeds.

It is a further object of this invention to provide new and novel sortation conveyors that minimize jamming of components during switching of pushers between straight paths and sortation paths.

It is yet a further object of this invention to provide a new and novel package pusher or diverter for a sortation conveyor.

It is yet a further object of this invention to provide a new and novel package pusher and article conveying member assemblies for a sortation conveyor.

It is yet still a further object of this invention to provide a new and novel article conveyor member for a sortation conveyor.

It is yet still a further object of this invention to provide a new and novel package pusher/article conveying member assembly for a sortation conveyor that facilitates mounting of the pusher diverter pin and pusher guide roller so as to minimize forces tending to rotate the pusher about the conveying member.

It is yet still a further object of this invention to provide a new and novel divert pin for sortation conveyors.

It is yet still a further object of this invention to provide a new and novel divert pin configuration for package pushers (diverters) for sortation conveyors.

It is yet still a further object of this invention to provide a new and novel configured divert pin for sortation conveyors that facilitates passage of the pin through sortation conveyor divert switches.

It is yet still a further object of this invention to provide new and novel switches for sortation conveyors.

It is yet still a further object of this invention to provide new and novel divert switches for sortation conveyors.

It is yet still a further object of this invention to provide new and novel divert switching for sortation conveyors wherein timing of movement of switching components is optimized for relatively faster conveyor speeds.

It is yet still a further object of this invention to provide new and novel actuators for switches for sortation conveyors.

It is yet still a further object of this invention to provide new and novel electrically powered and/or pneumatically powered high speed actuators for switches for sortation conveyors.

It is yet still a further object of this invention to provide new and novel sound deadening for switches for sortation conveyors.

It is yet still a further object of this invention to provide new and novel fluid actuated divert switches for sortation conveyors.

It is yet still a further object of this invention to provide new and novel electrically actuated switches for sortation conveyors.

It is yet still a further object of this invention to provide a new and novel electrical motor actuated divert switch for sortation conveyors.

It is yet still a further object of this invention to provide a new and novel electrical motor actuated cross-over switch for sortation conveyors.

Generally speaking, the objectives of the present invention are obtained by the use of relatively high speed actuators in the switching devices, where said actuators may be operated by electrical power, pneumatic power, or a combination thereof.

The objectives of the invention also are obtained by placing sound deadening materials at the interfaces between components of the switching devices.

The objectives of the present invention may also be obtained by the use of lightweight moving components in the switching devices.

The objectives of the invention may also be obtained by the use of selected components combined in such a way as to minimize friction in the switching devices.

The objectives of the invention may be further obtained by use of switching devices which do not require their actuators to provide the force necessary to deflect the divert pins.

The objectives may also be obtained by the use of an overlap between interacting parts of the switching devices to promote quiet operation.

Further, the objectives of the invention may be obtained by the use of curved surfaces on moving portions of the switching mechanisms to provide smooth acceleration of the divert pin in the lateral direction.

Other objects, features and advantages of the invention in its details of construction and arrangement of parts will be seen from the above and from the following description of the preferred embodiments when considered with the drawing and from the appended claims.

BRIEF DESCRIPTION OF THE DRAWING

In the drawing:

FIG. 2 is an end view of the sortation conveyor of FIG. 1;

FIG. 4 is an elevational view of the sortation conveyor of FIGS. 1–3 showing a package pusher coacting with a package;

FIG. 5A is a vertical sectional view through an alternative embodiment of package pusher and conveyor member incorporating the instant invention and usable with the sortation conveyor of FIGS. 1–4.

FIG. 6 is an elevational view of a portion of a divert pin for a sortation conveyor and incorporating the instant invention;

FIG. 7 is an end view looking at the divert end of the divert pin of FIG. 6 greatly enlarged to better show details thereof;

FIG. 12 is a enlarged view of a portion of the divert switch of FIGS. 8–11 showing switch components disposed to divert package pushers from the main path to a divert path;

FIG. 13 is a plan view of a portion of the divert switch of FIGS. 8–11 showing switch components not fully disposed to direct package pushers into a divert path;

DESCRIPTION OF THE PREFERRED EMBODIMENT

Figure 1:
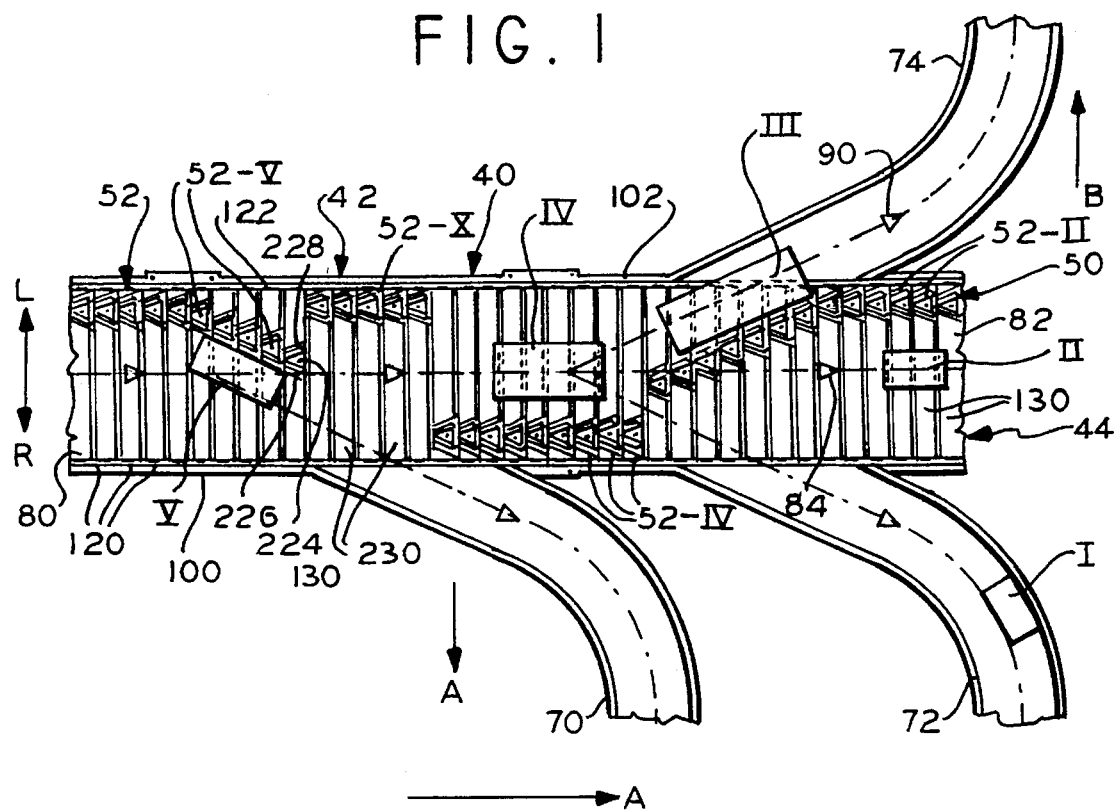
FIG. 1 is a plan view of a portion of a sortation conveyor incorporating the instant invention and showing a number of spur or divert conveyors disposed to receive packages therefrom.

With reference to FIGS. 1 and 2 there is generally shown at 40 a portion of a sortation conveyor including: a frame or support assembly 42; a conveyor bed or apron assembly 44 supported by frame 42 for movement in an endless loop; a conveyor drive assembly 46 (FIG. 2); a package pusher or divert system 50 (FIGS. 1 and 2) including a package pusher assembly 52, and one or more divert switch assemblies 54 (FIG. 2) with a guide and divert track system 56 (FIGS. 2, 3 and 4) carried by frame assembly 42 for coaction therewith. A control 60 (FIG. 2) of conventional construction is suitably connected to conveyor drive assembly 46 and to other controlled components such as switch assemblies 54 and is otherwise set up to render the controls required to operate sortation conveyor 40.

A number of divert or spur conveyors 70, 72, 74 (FIGS. 1 and 3) extend away from sortation conveyor 40 and form therewith a sortation conveyor system. It should be noted that sortation or main conveyor 40 extends from an input end 80 to an output end 82 along a main conveyor path 84; while divert conveyors 70, 72 extend away from conveyor 40 in the direction of arrow "A" and define divert conveyor paths 88 and divert conveyor 74 extends away from conveyor 40 in the direction of arrow "B" and defines a divert conveyor path 90. Divert conveyors 72, 74 are disposed directly opposite each other. While the sortation conveyor system has been shown with only three divert conveyors, two of which are opposite each other it should be understood that any number of divert conveyors may extend from main conveyor 40 and that such divert conveyors may extend to only one of either side thereof or to both sides thereof and that none of such divert conveyors need extend directly from opposite sides of the main conveyor or if desired or required there may be a number of pairs of directly opposite divert conveyors. The length of main conveyor 40 and its conveyor bed 44 and frame 42 are sized to facilitate the number and disposition of divert conveyors extending therefrom as well as the size, weight and configuration of packages being carried thereby. The term "package" is used generically and includes, for example, boxes, bags, cartons, or combinations and selected numbers thereof secured together as a unit.

Frame assembly 42 includes a suitable number of side rails 100, 102 (FIGS. 1 and 2) and cross-members 104, 106 (FIG. 2) suitably and appropriately connected together in conventional manner and by conventional means and to selected width and length to support the various assemblies and components of sortation conveyor 40; and to accommodate the desired number of divert conveyors 70–74. A number of support rails 110, 112, 114, and 116 (FIG. 2) are carried by frame assembly 42 and are disposed in opposite spaced pairs and to support wheels 120 (FIGS. 1 and 2) of conveyor bed or apron assembly 44.

A number of conveying members or slats 130 (FIGS. 1, 2 and 4) are utilized to form conveyor bed 44; the number of slats 130 being sufficient to form an endless loop conveyor of a length commensurate with the length of sortation conveyor 40. The width, height and length of slats 130 being selected to accommodate the size, weight and other characteristics of the packages to be conveyed and sorted. An end plate 132 (FIG. 2) secured at one end of each slat 130, while another end plate 134 (FIGS. 2 and 4A) is secured at the other end of each slat 130. End plates 132, 134 are secured to slats 130 by conventional means such as welding or the like but may, if desired, be formed integrally therewith. A side plate 136 (FIG. 2), secured to end plate 132 as by threaded members 138 or the like, rotatively carries proximate a trailing end thereof one of the support wheels 120; while a side plate 140 (FIGS. 2 and 4A) similarly secured to end plate 134 as by threaded members 142 or the like, rotatively carries proximate a trailing edge thereof one of the support wheels 122. Each side plate 136, 140 also has formed proximate its trailing edge a somewhat "C" shaped opening 144 (only shown for plates 140 in FIG. 4A) defined by a plastic insert 146 and a pair of hooks 148 which retain insert 146 in opening 144. A sleeve 150 fixedly carried by each side plate 136, 140 proximate a leading edge thereof and extending outwardly therefrom is rotatively received in opening 144 of the next adjacent downstream (in the direction of conveyor movement arrow A—FIG. 4A) side plate 136, 140). The leading edges of each side plate 136, 140 are offset so as to fit behind (in FIG. 4A) the trailing edges of the next adjacent downstream side plate 136, 140 as shown at location X, FIG. 4A. A plastic bushing 152 is disposed within each sleeve 150 and rotatively receives an extended portion 154 of a link pin 156 of a drive chain 160 of conveyor drive assembly 46.

Drive chain 160 comprises a length of otherwise conventional roller chain formed into an endless loop commensurate with the length of the endless loop of conveyor bed assembly 44. The links 162 (FIG. 4A) of drive chain 160 are secured together by link pins 156, 164 with each pin 164 sized to the width of chain 160 and each pin 156 formed with an extended portion 154. Some extended portions 154 are received in bushings 152 as hereinabove described while other extended portions 154 extend through elongated slots 166 formed in each side plate 136, 140 (only slots 166 for plate 140 shown in FIG. 4A). A washer 168 is received about some of the extended portions 154 of pins 156 and a hitch pin or hairpin cotter 170 is secured to such extended portions 154 to connect drive chain 160 to selected side plates 140 (or 136). Thus all of the slat conveying members 130 are connected to each other and to drive chain 160 in an articulated manner; firstly by the receipt in opening 144 of one side plate (136, 140) by a sleeve 150 of the next adjacent upstream side plate (136, 140), and secondly by the receipt within bushings 152 of sleeves 150 of extended portions 154 of selected link pins 156 of chain 160, as well as by the attachment of chain 160 to selected side plates (136, 140) through washers 168 and hitch pins 170. Such articulation permits movement of drive chains 160 about and by drive sprockets 180 (FIG. 2) carried by a drive shaft 182 disposed within and supported by frame assembly 42 as well as by other idler sprockets (not shown) to drive conveyor bed assembly 44. A suitable drive motor 184 imparts drive to shaft 182 in accordance with control 60. Wheels 120 travel along support rails 110 and wheels 122 travel along support rails 116 to support conveying members 130 while establishing and defining conveying bed 44 to move packages; while wheels 120, 122 travel along support rails 112, 114 respectively during the return run of conveying members 130.

The spacing of slats 130 (FIGS. 1 and 4A) from each other, as established by the above described connections between slats 130, side plates 136, 140 and chain 160, is such as to provide just enough space between adjacent slat conveying members 130 to permit sliding movement along the length of each slat 130 of its respective package pusher assembly 52 without interference from the package pusher assemblies 52 on adjacent members 130. Each conveying member 130 is, as described above, slat-like in configuration and formed as a hollow tube with a cross-section (FIG. 5) that may be defined as a rectangle with an elongated groove, as an upside-down "U" or as a "C" lying on its face or as a 2-pedestal desk. Each slat 130 may be formed from suitable materials such as metal or plastic and by an extrusion process, or they may be fabricated from sheet stock or otherwise from parts suitably secured together as by welding or the like. When so formed each slat is to have: a relatively flat upper wall 200; a pair of side walls 202 depending from upper wall 200; a pair of spaced bottom walls 204 and an inverted substantially "U" shaped channel 206 having side walls 208, 210 and a bottom wall 212 extending the length of each slat 130.

Each package pusher assembly 52 (FIGS. 1, 2, 4, 4A and 5) is formed with a body portion 220 (FIGS. 2, 4 and 5) formed with a slat receiving cavity 222 of a size and configuration to permit package pusher assembly 52 to closely but slidably fit about the periphery of slat 130. Body portion 220 is preferably cast or molded from suitable plastic and as a single, unitary part. A package pusher portion 224 (FIG. 1, 4, 4A and 5), formed integral with and so as to extend up from body portion 220, may be further formed with a right side divert face 226 (FIGS. 2 and 4) and/or a left side divert face 228 depending upon the requirements of sortation conveyor 40; with each such divert face extending at a predetermined angle outwardly from a trailing face 230 (FIGS. 1 and 4A) of pusher body 220 to a leading face 232 thereof. A pair of parallel walls 234 (FIG. 5) are formed integral within body portion 220 and so as to extend up into and across cavity 222 thereof. A metal plate 236, positioned and cast within a bottom wall 238 of pusher body 220, is formed with a "D" shaped opening 240 proximate the center thereof and which is aligned with an opening in a washer 242 secured to plate 236 as by welding or the like and an opening 244 that extends up through package pusher portion 224.

A divert pin 250 (FIGS. 5–7), provided for each package pusher assembly 52, is formed with: a divert end 252; a shank 254 separated from divert end 252 by a circumferential lip 256; and a threaded shank end 258. Pin 250 is sized to receive about its shank 254 a bearing adapter 260 with an inner race of a bearing 262 press fit about adapter 260 and positioned proximate lip 254 of pin 250. If desired, a washer 264 may be disposed between lip 254 and bearing 262. Shank 254 is formed with a flat 266 on its periphery proximate its threaded end 258 that aligns with the flat of "D" shaped opening 240 in plate 236 and is received therewithin. Threaded end 258 extends up through washer 242 to receive a nut 268 that is tightened to secure pin 250 in place with bearing adapter 260 pinched between lip 254 and the bottom of plate 236. Access to nut 268 to tighten same is obtained through opening 244 of pusher body 224. The location of flat 266 on shank 254 and of the flat side of "D" shaped opening 240 establishes an orientation for the divert end 252 of pin 250 such that a leading edge 280 (FIGS. 5, 6 and 7) and a trailing edge 282 (FIGS. 5 and 7) are properly disposed in guide tracks 56 (FIG. 3) as will be hereinafter explained in greater detail.

Divert ends 252 (FIG. 7) of guide pins 250 are fabricated with a cross sectional configuration that facilitates movement of guide pins 250 through tracks 56 (FIG. 3) and divert switch assemblies 54 thereby facilitating the required operation of package pusher divert system 50 (FIG. 1). Leading edge 280 of divert end 252 of pin 250 comprises a peripheral segment of relatively small radius extending from "h" to "a" about the periphery of divert end 252 on any horizontal cross-section through divert end 252 (such as that shown in FIG. 7) except for tip 284 of divert end 252. Trailing edge 282 comprises a similar peripheral segment "d"–"e" with the same relatively small radius as edge 280. Relatively larger peripheral segments 286, 288 are formed substantially ninety degrees removed from peripheral segments 280, 282 and are of relatively larger radius than that of segments 280, 282 extending from "b" to "c" and from "f" to "g" respectively. The remaining peripheral segments 290, 292, 294 and 296 extend from "a" to "b", "c" to "d", "e" to "f" and "g" to "h" respectively and close the periphery of divert end 252. These later segments (290–296) are of even relatively larger radius than segments 286, 288 and are almost flat. The described peripheral cross-section configuration of divert end 252 of pin 250 appears somewhat "football" shaped and serves to facilitate movement of pins 250 through divert switch assemblies 54 as will be hereinafter explained in greater detail.

It should be further noted that the provision of channel 206 in conveying members 130 and the attachment of pin 250 to pusher body 220 provides for a secure and relatively high disposition of pin 250 within pusher body 220 and with respect to conveying member 130. This shortens the relative distance the divert end 252 of pin 250 is from the rotative center of pusher body 220 about slat 130 and reduces rotative moments of pushers 220 about their respective conveying members 130 should pins 250 strike an object.

A number of lands 310 (FIG. 5) and grooves 312 are formed within cavity 222 of pusher body portion 220 each extending out from the inner surfaces of the walls of pusher body portion 220 and into cavity 222. Grooves 312 are rather shallow and most lands 310 thus only extend out a relatively short distance from the inner surfaces of the walls of cavity 222. However, a pair of special lands 314a extend down from an upper wall of cavity 222 proximate leading side 232 of pusher body portion 220 and a second pair of special lands 314b extend up from a lower wall of cavity 222 proximate its trailing side 230. The materials used to form pusher body portion 220 and conveying member 200 and lands 310 and grooves 312 facilitate the relatively smooth sliding movement of each pusher assembly 52 across its respective conveying member 130 when required to do so as will be hereinafter explained. However, forces generated upon divert ends 252 and rollers 262 of pins 250 during the coaction thereof with the divert and guide track system 56 (FIG. 3) and the switch assemblies 54 (as will be hereinafter explained in greater detail) and otherwise upon pusher assemblies 52 as they slide on conveying members 130 tend to rotate pusher assemblies 52 about their respective conveying member 130. Such forces could result in an unwanted cocking of a pusher assembly 52 about its conveying member 130 so as to tilt its leading side 232 down towards conveying member 130 with a corresponding raising of trailing side 230. By utilizing special lands 314 as disposed (i.e. two extending down from the upper cavity wall and two extending up from the lower cavity wall), and with no forces on divert pin 252 the positioning of pusher body 220 on conveying member 130 is such as to slightly raise leading side 232 of pusher assembly 52 with respect to the plane within which conveying member 130 is disposed thus cocking leading side 232 up, and tilting divert pin 250 forward by a relatively small angle "z" (FIG. 5) with respect to a line "s" perpendicular to the upper surface 200 of conveying member 130. As such, when either divert end 252 of pin 250 or roller 262 thereof, or both, coact with track system 56 and upon the application of forces to these members (in directions perpendicular to an axis "r" passing longitudinally through the center of pin 250 and generally opposite to the direction of travel "A" of pusher assemblies 52 and conveying members 130) there will be a tendency to align line "s" and axis "r" to render same colinear and as such to uncock pusher body 220 with respect to its conveying member 130.

Figure 5:
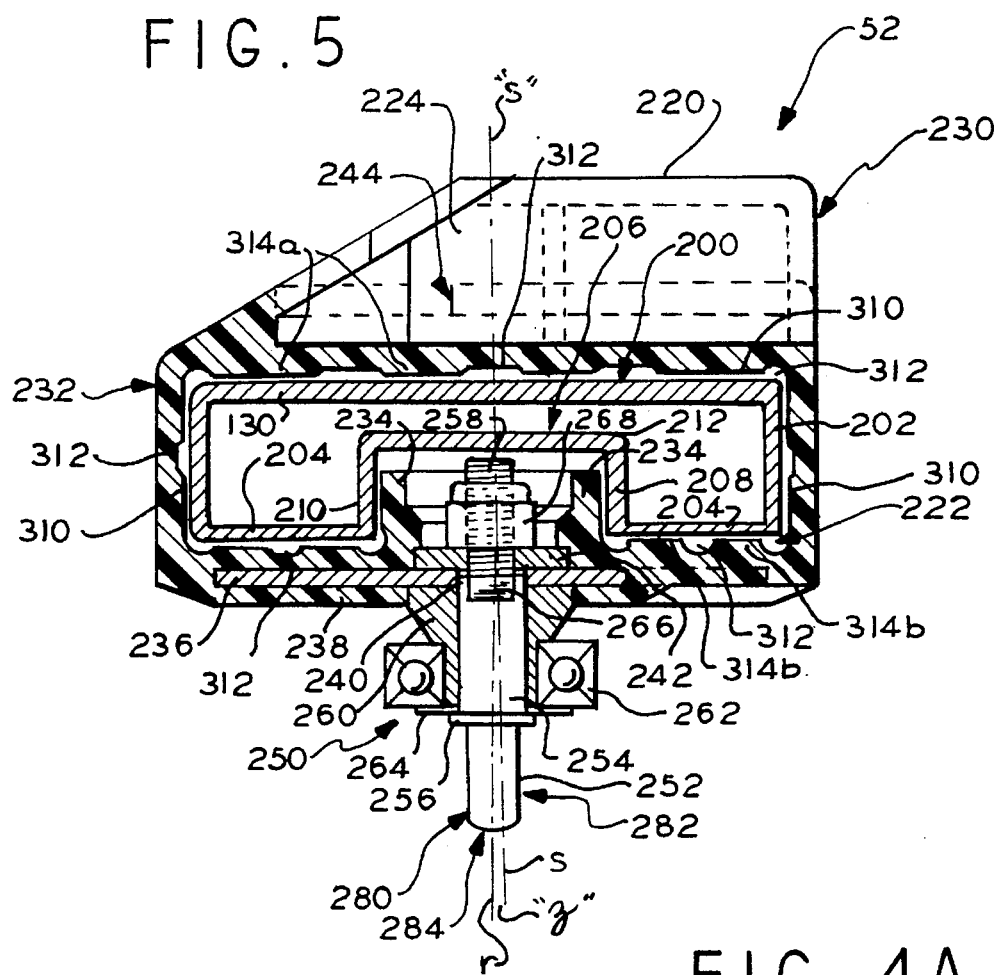
FIG. 5 is a vertical sectional view through a package pusher and conveying member of the sortation conveyor of FIGS. 1–4 and incorporating the instant invention.

An alternative construction and configuration of conveying member or slat 330 is shown in cross-section in FIG. 5A disposed for coaction with a pusher assembly 52 that is identical to pusher assembly 52 hereinabove described (FIG. 5). Conveying member 330 (FIG. 5A), like member 130 (FIG. 5), in cross-section, presents the appearance of a modified up-side down "u" or of a 2-pedestal desk. It includes a pair of spaced pedestals or legs 332, 334 spanned across their top by an upper wall 336, an upper surface 338 of which forms the package conveying surface. The space between legs 332, 334 defines a channel 340 extending the length of member 330 and presenting guide walls 342, 344 disposed to coact with walls 234 of pusher assembly 52 as described above for pusher assembly 52 and conveying member 130. A number of ribs 346 extend down from an underside of upper wall 336 and into channel 340 to strengthen member 330 and its upper wall 336.

Conveying member 330 is formed of extruded metal, such as aluminum, or of a suitable plastic and includes at least at its respective ends openings 348, which may, if desired, extend the entire length of member 330. Openings 348 are sized and disposed to receive securing means such as threaded members (not shown) by which an end plate (not shown but which may be similar to end plates 132,134 FIG. 2) are secured to respective ends of conveying members 330. Conveying members 330, in all other respects, are connected to chain assembly 160 and wheels 120, 122, mount pusher assemblies 52, and function as hereinabove described for members 130. It should again be noted that conveying members 330 extend through slat receiving cavity 222 of pusher body 220 except that there are no side walls on members 330. Lands 310 extend into cavity 222 and are separated by grooves 312 and include special lands 314 that extend into cavity 222 a slightly greater amount than lands 310. As such pusher assembly 52 assumes a cocked disposition on conveyor member 330 with axis "r" of its divert pin 250 disposed at a selected but generally relatively slight angle "z" with respect to perpendicular line "s" of member 330; all similar to and for reasons described above with reference to conveying members 130 and their pushers 52 (FIG. 5).

A guide track 360 (FIGS. 2 and 3) carried by a rail 362 (FIG. 2) spanning the top of cross-members 104, is disposed proximate side rail 100 (FIGS. 2 and 3) of conveyor frame assembly 42 and extends the length thereof from input end 80 (FIG. 3) to output end 82. A longitudinal groove 364 extends the length of track 360 and is of a size and configuration to receive divert ends 252 of pins 250 of pusher assemblies 52 when disposed proximate side rail 100. A return guide track 366 (FIG. 2), similarly carried by a rail 362 spanning the bottom of cross-members 106, extends from output end 82 to input end 80 of conveyor 40 and is formed with a longitudinal groove 368 extending the length of track 366 and of a size and configuration to receive divert ends 252 of pins 250. Another guide track 370 (FIG. 3), carried by a rail (not shown) identical to rails 362 and spanning the top of cross-member 104, is disposed proximate side rail 102 of conveyor frame assembly 42 and also extends the length thereof from input end 80 to output end 82. A longitudinal groove 374 extends the length of track 370 and is of a size and configuration to receive divert ends 252 of pins 250. A return guide track 376 (FIG. 2), similarly carried by a rail 362 spanning the bottom of cross-members 106, extends from output end 82 to input end 80 of conveyor 40 and is formed with a longitudinal groove 378 extending the length of track 376 and of a size and configuration to receive divert ends 252 of pins 250. Guide tracks 360, 370 and return guide tracks 366 and 376 are identical in construction and may be extruded from aluminum, plastic or other suitable material or otherwise fabricated or formed.

During the return run of conveying members 130 (or 330) their respective pusher assemblies 52 may be directed by conventional mechanisms (not shown) towards either side rail 100 or side rail 102 under action of control 60 and depending upon the anticipated use of the respective pusher assembly during the ensuing conveying of packages. Alternatively, the switches described in this application may be used. As such and upon movement of each conveying member 130 into input end 80 the divert end 252 of pin 250 of its respective pusher assembly 52 will be confined to travel in its respective groove 364 or 374 and the respective pusher will be confined to travel proximate its side rail 100 or 102. Pusher assemblies 52 will remain so confined to travel proximate a side rail 100, 102 if a package or packages traveling proximate thereto is to move from input end 80 to and off output end 82 as shown for packages II and IV in FIG. 1.

A divert track 380 (FIGS. 3 and 4), carried by a rail 382 (FIG. 4) spanning the top of a cross-member 104 of conveyor assembly 42, extends across the width of conveyor frame assembly 42 from a disposition proximate guide track 370 to a disposition proximate guide track 360. A guide surface 384 of track 380 is carried by rail 382 at a disposition to coact with bearings 262, rotatively carried by pins 250 of the pusher assemblies 52, that are directed from guide track 370 by divert switch 54a (FIG. 3), as will be hereinafter explained. That coaction and the forces generated therebetween due to the movement of the respective conveyor members 130 in the direction of movement of conveyor bed 44 (arrow M, FIG. 3) effects a camming action and a gliding movement of each such pusher assembly 52 across its respective conveyor member 130 (in the direction of arrow A—FIG. 3) to divert packages from conveyor bed 44 to spur or divert conveyor 70 as will be hereinafter explained in greater detail. A junction 386 (FIG. 3) receives divert pins 252 from pusher assemblies 52 so diverted by track 380 and guides such pins 252 into groove 364 of guide track 360 so that their associated pusher assemblies 52 proceed in the direction of movement of conveyor bed 44 along with their carrying conveyor member 130. Additional divert tracks, such as track 380, are similarly disposed across crossmembers 104 extending from divert switches 54 positioned either at various locations of guide track 360 or guide track 370 and extending to a junction 386 of the opposite guide track to thereby cam pusher assemblies 52 and packages across conveyor bed 44 and onto other similarly positioned divert or spur conveyors.

In some instances, where divert or spur conveyors are disposed directly opposite each other on conveyor 40, such as shown for divert conveyors 72, 74 (FIG. 3), a divert track 390 extends from a divert switch 54b at guide track 370 to a junction 396 with guide track 360 while a divert track 400 extends from a divert switch 54c at guide track 370 to a junction 406 with guide track 360. Because tracks 390, 400 must cross, a cross-over switch 410 is disposed at the intersection of such divert tracks. Corresponding sections of tracks 390, 400 are either removed to facilitate disposition and operation of cross-over switch 410 or tracks 390, 400 are each fabricated in two sections (390a, 390b, 400a, 400b) to accommodate cross-over switch 410. In all instances such divert tracks include a surface (such as surface 384 of track 380—FIG. 4) disposed to coact with bearings 262 of pusher assemblies 52 that are to effect movement of packages onto the spur or divert conveyors.

Junctions 386, 396 and 406 are all of substantially identical construction. Each includes suitable mounting members, such as a plate 412 (shown in FIG. 3 for junction 386), which mount a return guide 414 so that a guide surface 416 thereof is in position to guide pins 252 of pusher assemblies 52 until such divert pins 252 re-enter their respective guide tracks 360, 370 at a re-entry location 418. Each re-entry location 418 may be provided by forming an opening in the appropriate leg of "U" shaped guide track 360, 370, sized and configured to smoothly receive the respective return guide 414 and permit passage into groove 364 guide track 360 of divert ends 252 of pins 250. Alternatively, location 418 may be provided by inserting a specially fabricated section of guide track 360, 370 that includes an opening sized and configured to receive return guide 414 and re-entry of divert pins 252 into groove 364 (374) of guide track 360 (370). Re-entry of divert pins 252 into tracks 360 (370) is facilitated by contouring the opening and wall of track 360, 370 to provide a smooth transition surface that either guides or otherwise facilitates the entry of divert pins 252 back into grooves 364, 374 respectively of guide tracks 360, 370.

Figure 3:
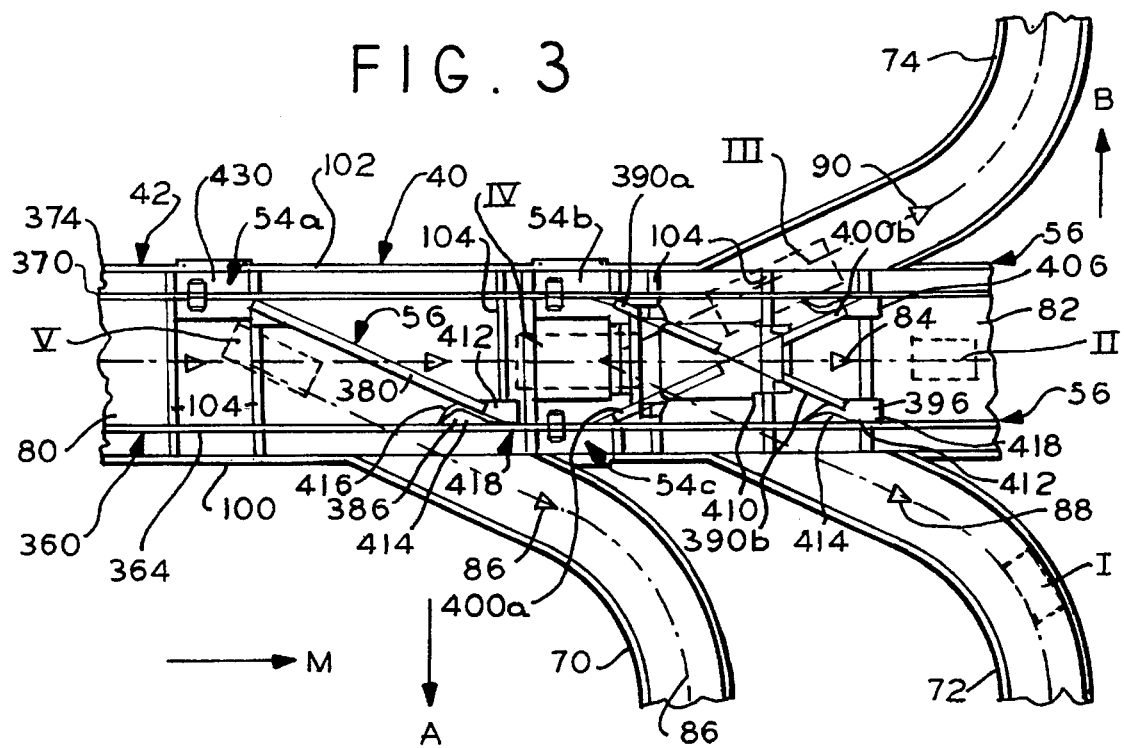
FIG. 3 is a plan view of the portion of the sortation conveyor of FIG. 1 but with the conveying members removed to show underlying switch and guide devices and constructions.
Figure 4A:
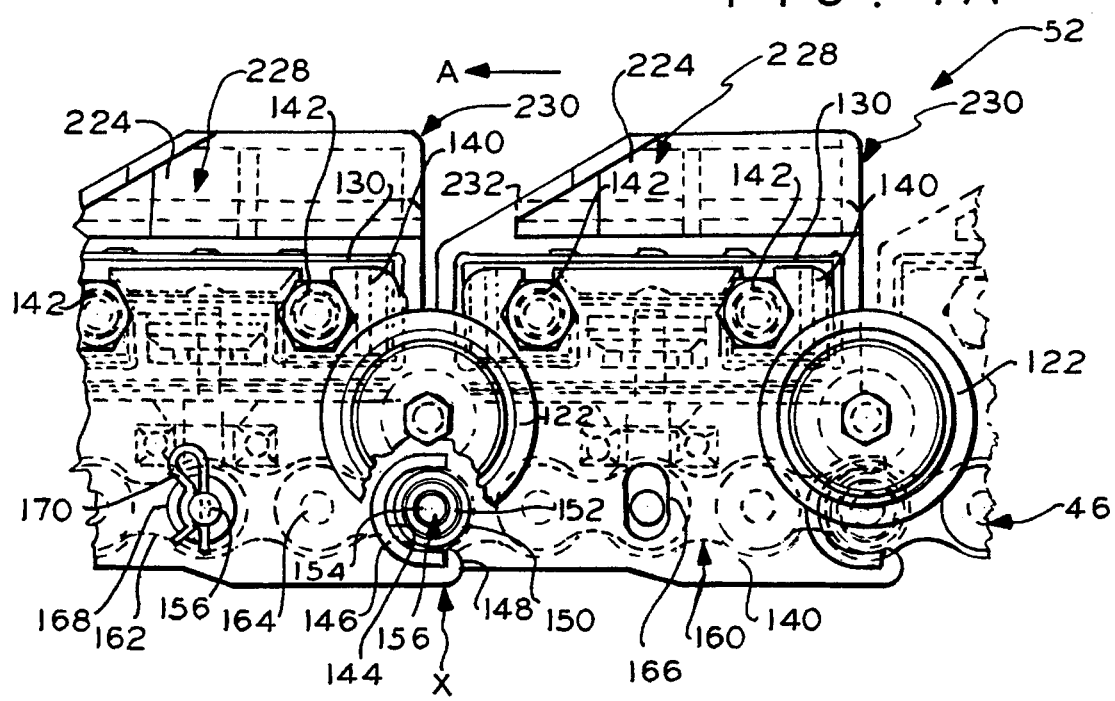
FIG. 4A is a partial elevation drawing of the slat and chain assembly for the sortation conveyor of FIGS. 1–3.
Figure 11:
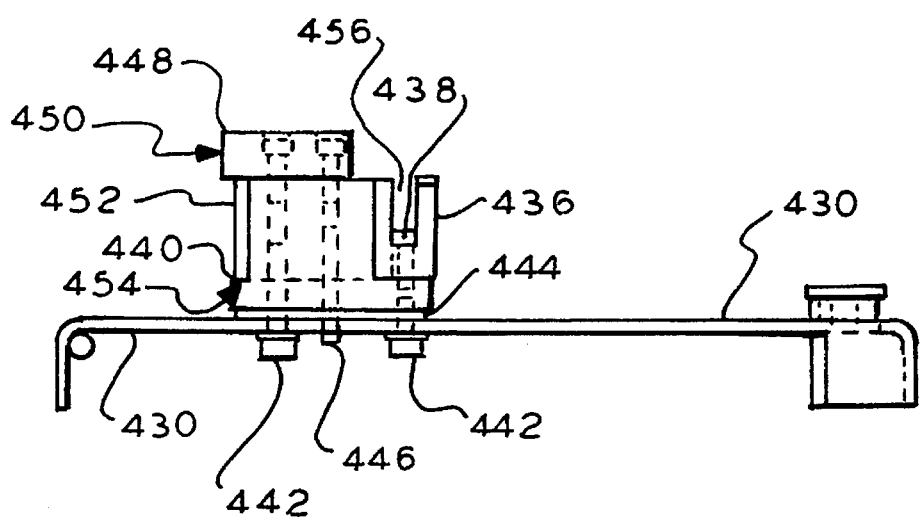
FIG. 11 is a right end elevational view of the divert switch of FIG. 8, with parts removed to better show details thereof.

Divert switch assembly 54a (FIGS. 2, 3 and 8–10) is carried by a switch plate 430 (FIGS. 8–12) mounted by and between a pair of cross-members 104 (FIGS. 2 and 3) of frame assembly 42. A guide pin entrance block 432 (FIGS. 8, 9 and 12) is fixedly secured to plate 430 by suitable means, such as a pair of threaded fasteners 434 (FIG. 9) or the like, and with a groove 435 extending therethrough in alignment with groove 364 of guide track 360 (FIG. 3). A guide pin exit block 436 (FIGS. 8, 11 and 12) is secured, as by a threaded fastener 438 (FIG. 11) or the like to a diverter block 440 (FIGS. 8, 9, 11 and 12) that is in turn, secured to plate 430 by threaded fasteners 442 or the like. If desired a mounting pad 444 may be placed between block 440 and plate 430. A locator pin 446 may also be used to facilitate locating these parts with respect to each other. A top diverter 448 is fixedly secured on top of diverter block 440 by appropriate means such as threaded fasteners or the like and provides a curved cam surface 450 disposed for coaction with wheels 262 of pusher assemblies 52. A diverter blade 452 is secured to a face of diverter block 440 between a ledge 454 (FIGS. 9 and 11) of block 440 and its top 448.

Exit block 436 is secured to block 440 so that a groove 456 extending therethrough is in alignment with groove 435 of entrance block 432 and so that its groove 456 will also be in alignment with groove 364 of guide track 360 disposed proximate exit block 436. A space 460 (FIGS. 8 and 9), provided between guide pin entrance block 432 and guide pin exit block 436 is of a size and configuration to receive a switch block 462 (FIGS. 8–10) fixedly carried on top of a slide table 464. A pair of spaced slide shafts 466 extend through suitably sized and spaced openings formed through table 464 and support table 464 for sliding movement (in the directions of arrows A and B—FIGS. 8 and 10) between a pair of spaced slide mounting blocks 468, 470 respectively secured to plate 430 by threaded fasteners 472 or the like. A straight pin guide 474 is fixedly disposed over and spans entrance block 432, exit block 436 and space 460 therebetween.

Figure 8:
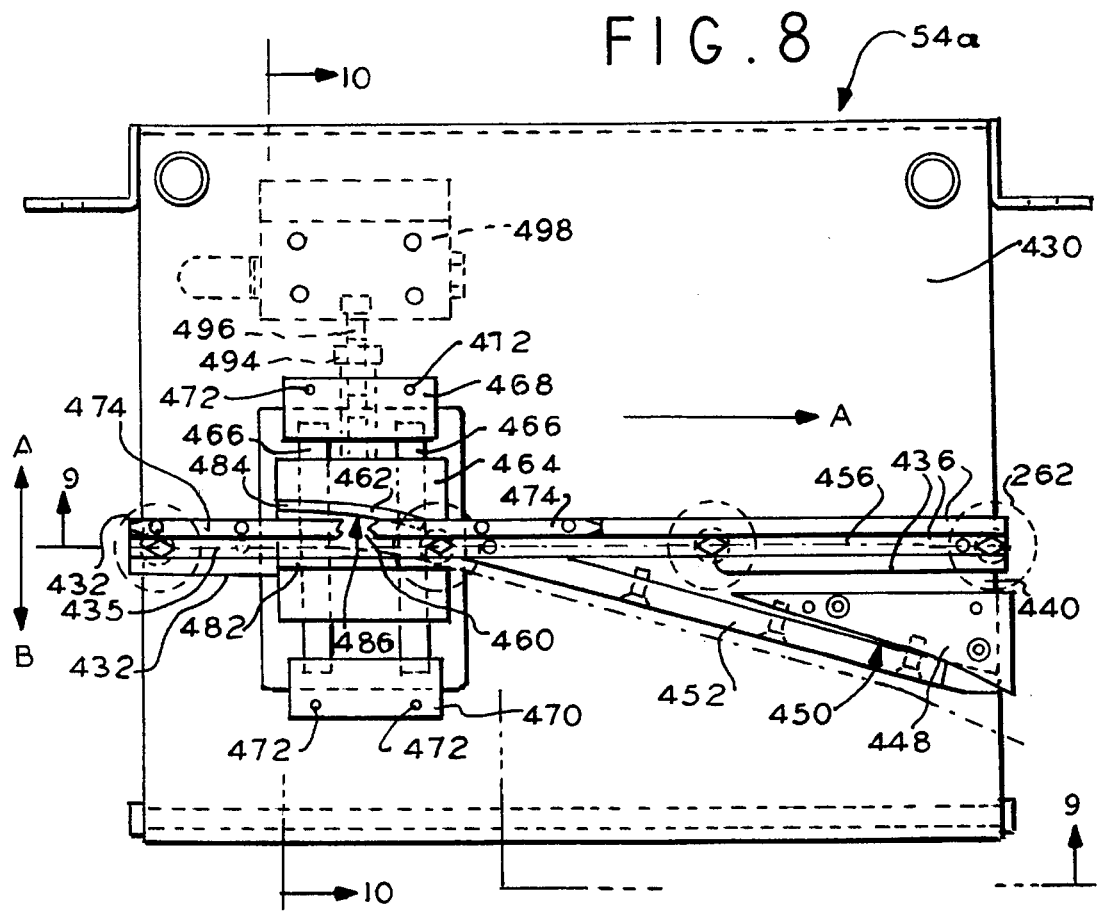
FIG. 8 is a plan view of a pneumatically actuated divert switch for a sortation conveyor, such as that of FIGS. 1–4, incorporating the instant invention.
Figure 9:
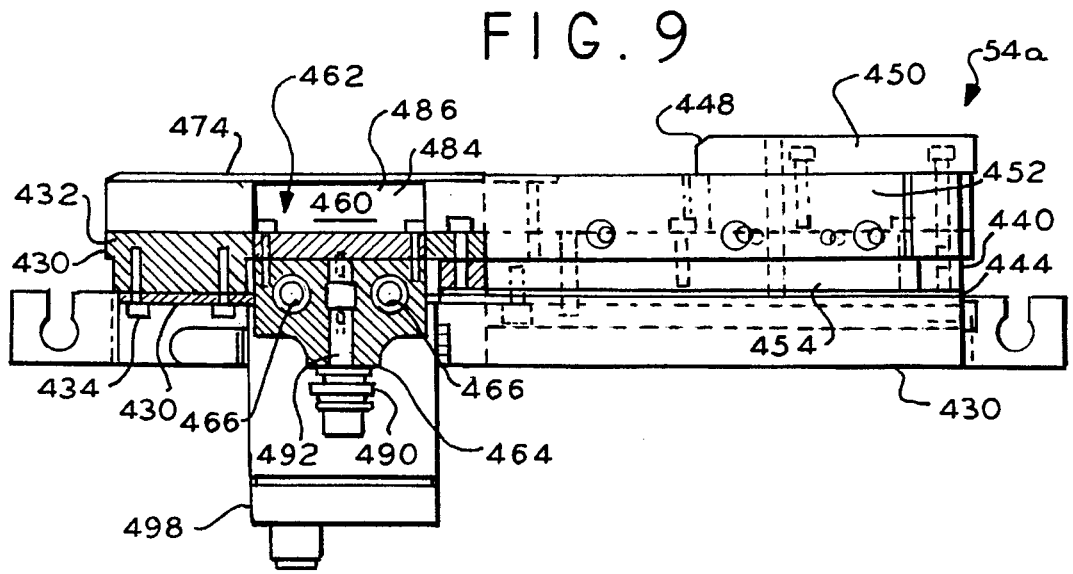
FIG. 9 is a side elevational view of the divert switch of FIG. 8 taken on line 9—9 of FIG. 8.
Figure 10:
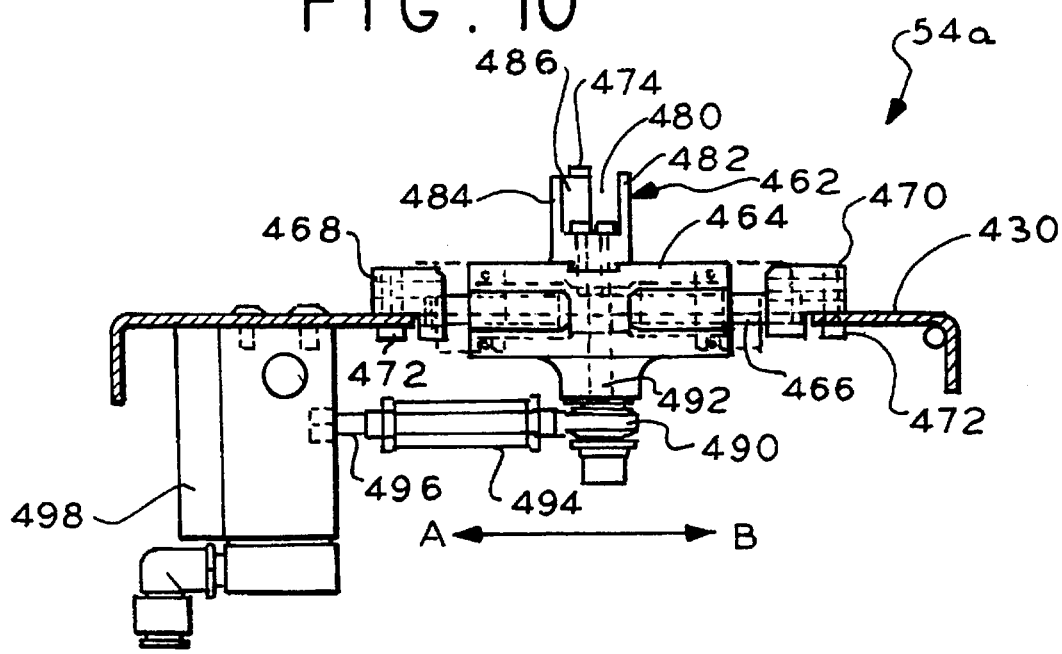
FIG. 10 is an elevational view of the divert switch of FIG. 8 taken along line 10—10 of FIG. 8.

Switch block 462 is somewhat "U" shaped in configuration and includes a track 480 (FIG. 10) of a size and configuration to receive divert pins 252. A first leg 482 of block 462 is disposed to be in alignment with one side of track 370 when switch block 462 is in a first or straight-through disposition with respect to track 370 as shown in FIG. 8 and will be out of alignment with that side of track 370 when switch block 462 is in a second or divert disposition (FIG. 12) with respect to track 370. A second leg 484 of block 462 presents a curved camming surface 486 and is disposed to be out of alignment with track 370 in the straight-through disposition of block 462 and in a blocking position with respect to track 370 in the divert disposition of block 462 so as to intercept pins 252 and direct same against surface 450 of divert blade 452.

A spherical rod end 490 (FIGS. 9 and 10) is connected to a shaft 492 that extends down from slide table 464 and is connected by an adjustment member 494 (FIG. 10) to an actuator shaft 496 of a pneumatic linear actuator 498 suitably mounted to plate 430. Pneumatic linear actuator 498 is a DANFOSS type fast linear actuator and is bi-directional. It utilizes a pair of coils separately energized to move actuator shaft 496 in the directions of arrow A and B. Fast reaction time and high speed is achieved by initially energizing either one or the other coil with a selected relatively high energy pulse preferably of dc voltage for a selected period of time and thereafter a relatively low energy pulse by reducing the dc voltage to maintain the position of actuator shaft 496. For example, the selected dc voltage might be plus 48 volts and the selected time might be 7 milliseconds while the reduced dc voltage could be plus 7 volts. The electrical components of actuator 498 are suitably supplied with power and control signals through control 60; while the pneumatic components of actuator 498 are supplied with suitable air pressure which may be at about 30 PSI although other pressures could be used.

A sensing device such as a proximity detector, photo cell, or other device may be located with respect to conveyor 40 in a position to sense the location of pusher assembly 52, slats 130, wheels 120, 122, side plates 136,140 or other parts of apron 44 capable of producing a timing signal for controls 60 as apron 44 travels around conveyor frame 71. Also, other electronic signals could be provided by a bar code reader, laser scanner, manual control, or other external source such as computer, etc., which in conjunction with the aforementioned timing signal could cause electronic control 60 to provide a switching signal to pneumatic actuator means at 498 at the precise instant required to cause switch block 462 to move from one position to the other in between divert pins 252 as they are moving through switching assembly 54a.

Slide shafts 466 may be flexibly mounted in slide mounting blocks 468, 470 thereby providing some tolerance for misalignment of mounting blocks 468, 470 and/or slide shafts 466. Slide table 464 may be provided with bushings seated in bores provided in slide table 464 for that purpose. Such bushings may also be flexibly retained in slide table 464 to allow for misalignment of slide shafts 466 and/or bores in slide table 464. Since spherical rod end 490 is attached to slide table 464 through adjustment member 494, which may be a turnbuckle of conventional design, said adjustment member 494 may be used to align the position of switch block 462 with guide pin entrance block 432 and guide pin exit block 436. Divert or guide pins 252 are shown in FIG. 8 in typically spaced intervals relative to each other and relative to divert switch assembly 54 (i.e. as pins 252 would be positioned beneath their respective package pusher assemblies 52 as carried by conveying members 130 as such conveying members 130 move from input end 80 to output end 82 of conveyor 40—FIG. 1). Pins 252 travel in the direction of arrow A (FIG. 8) straight-through switch assembly 54 because slide table 464 and switch block 462 have been positioned by actuator 498 so that surface 486 of switch block 462 is out of the path of pin 252. As such pins 252 move from guide track 370 (FIG. 3) through switch assembly 54 and back into guide track 370 with their respective package pushers 52 accordingly moving along side rail 102 as shown for pushers 52-X in FIG. 1. A package, such as package IV, aligned with pushers 52-IV would thus be moved by conveying members 130 to and through output end 82 of conveyor 40 as shown for package II. It should be noted that package pushers 52-II (FIG. 1) in a manner similar to pushers 52-IV have moved with conveying members 130 but along side rail 102 since divert pins 252 of these pushers remained in guide track 370 (FIG. 3) and passed straight-through any divert switch assemblies 54 disposed therealong since such switch assemblies would have been disposed as shown in FIG. 8. A switch assembly 54 disposed to direct packages to a conveyor such as conveyor 74 would have its actuator 498, table 464, divert switch block 462, blade 452 top diverter 448 and corresponding components arranged as a mirror image of those components shown in FIG. 8.

Bearings 262 (which function as wheels and cam followers) are shown in phantom in FIGS. 8, 12 and 13 because they are positioned above the corresponding divert pin 252. When switch block 462 is disposed to direct pins 252 in a straight path as shown in FIG. 8 followers 262 do not coact with any component of switch assembly 54.

If it is desired to divert a package onto divert conveyor 70 then control 60 would have been programmed to operate actuator 498 of divert switch assembly 54a and have same effect movement of its slide table 464 and switch block 462 in the direction of arrow B (FIG. 8) from the FIG. 8 disposition thereof into the FIG. 12 disposition thereof. Switch assembly 54a would be so operated in time to receive divert pin 252 of the first package pusher assembly 52 carried by a conveying member 130 such that when that divert pin 252 is diverted it will cause its pusher assembly 52 to slide across its conveying member 130 in the direction of arrow R (FIG. 1) in time to intercept a package such as shown for package V. Divert switch assembly 54a will remain so operated by control 60 until a sufficient number of pusher assemblies 52 have been so diverted to accomplish a proper diverting of package V as required by the size of package I (see pushers 52-V in FIG. 1). Thereafter control 60 will signal actuator 498 of switch 54a and switch 54a will return to its FIG. 8 disposition.

Camming surface 486 of switch block 462 of switch 54a, while in its FIG. 12 disposition, will intercept the movement in the direction of arrow A of divert pins 252. Continued movement of conveying members 130 in the direction of arrow A will result in their respective pins 252 being cammed by surface 486 out of guide track 370 through the space between surface 486 and the end of leg 482 of switch block 462 and along the surface of divert blade 452. Cam followers 262 associated with such divert pins will be moved into engagement with an follow surface 450 of diverter top 448 and upon exiting switch 54a such cam followers 262 will engage and follow divert track 380 (FIG. 3). The respective pusher assemblies 52-V will thus move across their respective conveying members 130 until their package (package V) is moved onto divert conveyor 70 wherefrom package V will follow path 86 thereof. As each such package pusher 52-V nears guide track 360 its pin 252 will be directed by return guide 414 into guide track 360 and such package pushers will move along side rail 100 through output end 82 of conveyor 40. Upon movement of such pushers 52-V with their conveying members 130 into the return run for such conveying members 130 such pushers 52-V will be repositioned along side rail 102 or 100 by one or more switch assemblies 54a disposed to coact with pins 252 during the return run of conveyor 40 and as required for the next run of such conveying members.

Should switch block 462 not fully move into its FIG. 12 disposition (which would constitute operation in a manner which is not consistent and not anticipated as happening too often) then its camming surface 486 would be disposed as shown in FIG. 13. The transition from such camming surface 486 to the surface of divert blade 452 would not be smooth and a tip of blade 452 would be disposed in the path of divert pins 252 being otherwise diverted by surface 486 as described above with reference to FIG. 12. A round divert pin could hang up at such a point resulting in possible damage to such pins and failure of their associated pusher assembly 52 to operate properly. However, due to the relatively small radius at leading edge 280 of pin 252, guide pin 252 will move about the tip of blade 452 and thereafter follow blade 452 as described with reference to FIG. 12. The surface contours of pin 252 at 290 (296), 286 (288) and 292 (294) also facilitates movement of pin 252 about a tip of blade 452 (as would be presented in a FIG. 13 disposition) and back into proper camming engagement with blade 452.

Divert switches 54b, 54c (FIG. 3) may be of the type, construction and use as described above for switch 54a (FIGS. 8–10) or alternatively divert switches 54b and/or 54c (and for that matter 54a) may be of an alternative and preferred type and construction as will be hereinafter described with reference to FIGS. 14–17. It is noted that switches 54b and 54c (FIG. 3) are disposed on opposite sides of conveyor 40 and respectively direct associated divert pins 252 (FIGS. 14, 16 and 17) and their package pusher assemblies 52 (not shown) along respective divert tracks 390, 390b or 400a, 400b to divert conveyors 72, 74 respectively; and that because such divert tracks 390a, 390b cross tracks 400a, 400b a cross-over switch 410 is disposed for coaction therewith as will be hereinafter explained in greater detail. Also divert switches 54b and 54c respectively divert from opposite sides of conveyor 40 and are accordingly mirror images of each other when switches of otherwise identical type and construction are utilized. Accordingly, only one such switch construction, i.e. for divert switch 54b, will be described in detail; it being understood that the other such switch, i.e. divert switch 54c, is a mirror image thereof.

Divert switch 54b comprises an electric motor actuated divert switch 530 (FIGS. 14–17) carried by a switch plate 430b, mounted by and between a pair of cross-members 104 (FIGS. 2 and 3). A guide pin entrance block 532 (FIGS. 14–17) formed with a longitudinally extending groove 535, is fixedly secured to plate 430b by suitable means, such as a number of threaded fasteners 434 (FIG. 15) or the like, and with its groove 535 aligned with groove 374 of guide track 370 (FIG. 3) (or groove 364 of track 360). A guide pin exit block 536 (FIGS. 14–17) is secured, as by threaded fasteners 538 (FIGS. 14 and 15), or the like, to a divert block 540 (FIGS. 14–16) that is, in turn, secured to plate 430b by threaded fasteners 542 or the like. If desired a mounting pad 544 (FIG. 15) may be placed between block 540 and plate 430b. A top diverter 548, fixedly secured on top of diverter block 540 by appropriate means such as threaded fasteners 550 or the like, provides a curved cam surface 552 disposed for coaction with wheel 262 of package pusher assembly 52. A diverter blade 554 is secured to a face of diverter block 540 between a ledge 556 (FIG. 15) of block 540 and its top 548 by a number of threaded fasteners 558.

Exit block 536 is secured to block 540 so that a groove 560 extending therethrough is in alignment with groove 535 of entrance block 532 and so that its groove 560 will also be in alignment with groove 364 of guide track 360 disposed proximate exit block 536. A threaded fastener 562, or the like, secures an end 564 of guide pin exit block 536 to guide pin entrance block 532 to facilitate alignment of their respective grooves 560, 535.

A space 570 (FIGS. 14–17) is provided at an inside end 572 of entrance block 532 and extending therefrom until a leading end 574 of diverter blade 554. A diverter switch gate 580, sized and configured to extend the length of space 570 from entrance block 532 to diverter blade 554, is secured to the top of a shaft 582 of a divert motor 584 by a clamp assembly 586. Divert motor 584 is secured beneath plate 430b by suitable means such as threaded fasteners or the like (not shown) with a suitable opening (not shown) extending through plate 430b so that motor shaft 582 can extend from motor 584 up through plate 430b.

Figure 16:
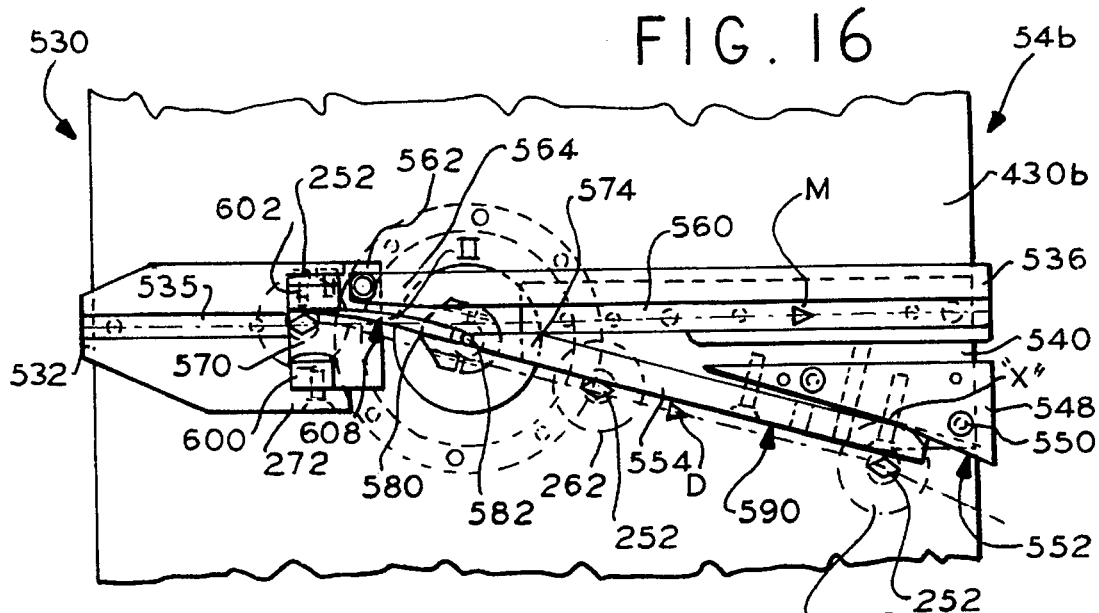
FIG. 16 is plan view of a portion of the electric motor divert switch of FIGS. 14–15 showing switch components disposed to divert package pushers from the main path to a divert path.

Motor 584 is suitably connected to a source of electric power and to control 60 and is a fast acting high torque limited angle D.C. motor. The angle through which divert motor 584 operates is selected to rock a leading end 588 of divert switch gate 580 between a position I (FIG. 14) establishing a straight-through path (arrow M) for divert pins 252 through groove 535 of entrance block 532 and through groove 560 of exit block 536 and a position II (FIG. 16) establishing a path for divert pins 252 through groove 535 of entrance block 532 and then along a surface 590 of divert blade 554 along a divert path D. A first bumper 600 is secured to entrance block 532 for coaction with leading end 588 of gate 580 when in its position I (FIG. 14); while a bumper 602 is secured to entrance block 532 for coaction with leading end 588 of gate 580 when in its position II (FIG. 16). Bumpers 600, 602 are of conventional materials and function to not only facilitate limiting the movement of gate 580 but also to provide a cushion so that gate 580 is brought to a stop without undue noise or wear. Bumper 602 is provided with a relatively flat face to cooperate with one surface of gate 580 while bumper 600 is provided with a curved face to cooperate with the other surface of gate 580.

If desired a key (not shown) may be utilized between gate 580 and motor shaft 582 to provide a positive locational relationship therebetween and facilitate prevention of relative rotation between motor shaft 582 and gate 580 so that arcuate movement of motor shaft 582 is translated to corresponding movement of gate 580 and so that gate 580 moves in an arc with the centerline of motor shaft 582 as its center or rotation. Other means of attaching gate 580 to motor shaft 582 may be utilized. A lower section 604 (FIG. 15) of gate 580 is of a size, configuration and location, to further facilitate attachment of gate 580 to motor shaft 582 while providing proper support for gate 580. Gate 580 is relatively narrower than the diameter of motor shaft 582. A projection 606 (FIGS. 14 and 15) of divert blade 554 overhangs an adjacent end of gate 580 and also fits into a recess formed therein to provide a smooth transition for divert pins 252 moving from gate 580 to surface 590 of blade 554.

Figure 14:
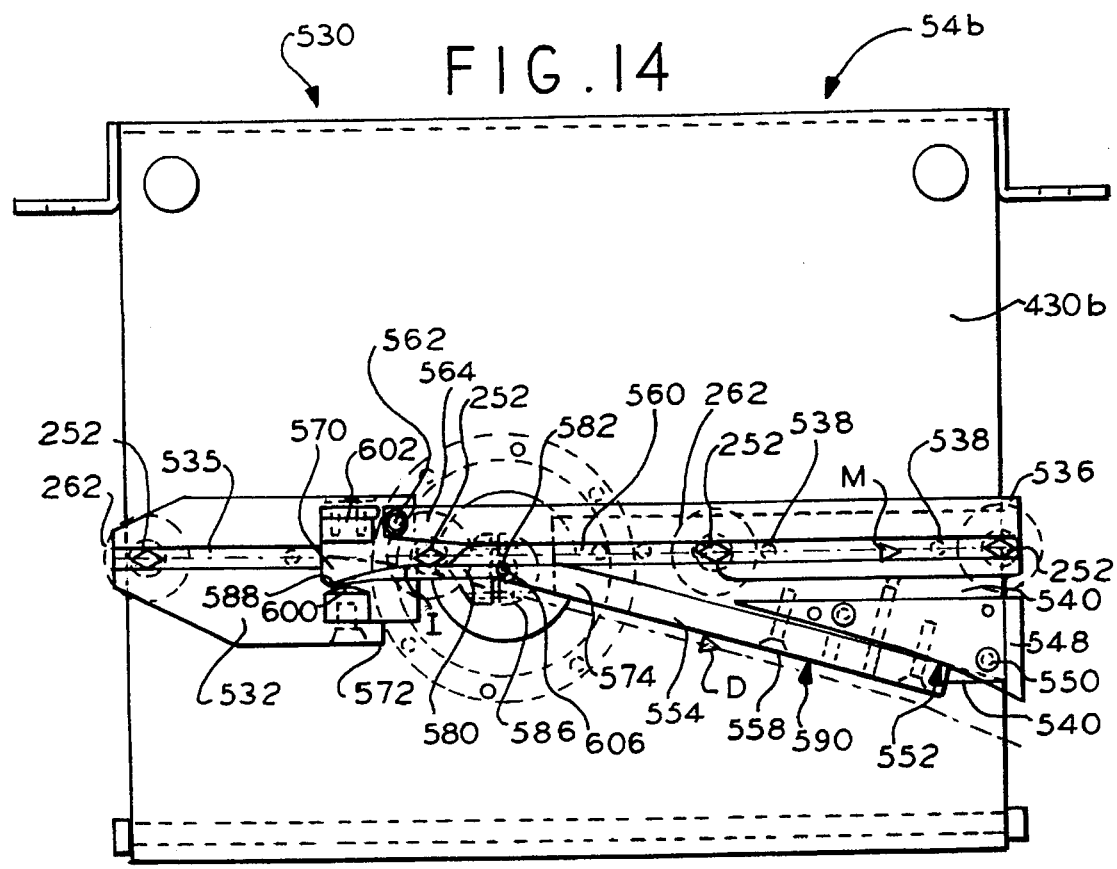
FIG. 14 is a plan view of an electric motor actuated divert switch for a sortation conveyor, such as that of FIGS. 1–4, incorporating the instant invention.
Figure 15:
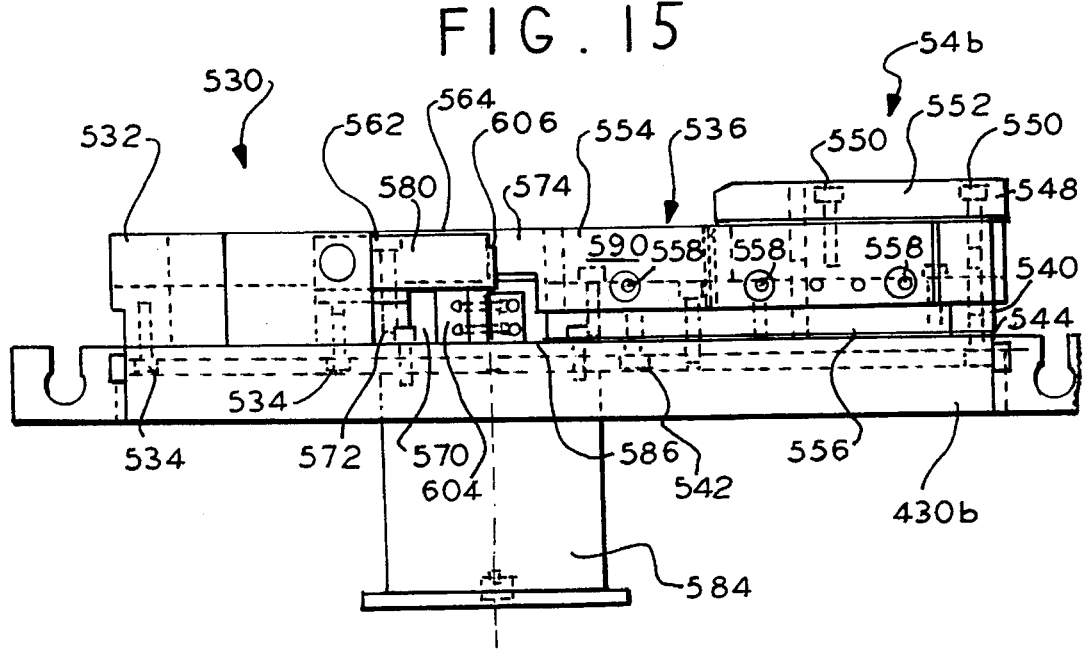
FIG. 15 is a side elevational view of the divert switch of FIG. 14.

In the FIG. 14 disposition of gate 580 divert pins 252 proceed through switch 530 along path M. Cam follower 262 does not operatively contact any part of switch 530. Divert pins 252 travel along path M from groove 374 of track 370 through grooves 535 and 560 and back into groove 374 of track 370 (or through grooves 364 of track 360 if switch 530 is disposed for coaction with track 360). In the FIG. 16 disposition of gate 580 divert pins 252 proceed from groove 374 of track 370 (364 of track 360) through groove 535 of entrance guide block 532 and into engagement with surface 608 of gate 580 which cams divert pins 252 and their associated package pushers 52 along path D. Divert pins 252 proceed from surface 608 of gate 580 to surface 590 of divert blade 554 following path D until the surface of cam followers 262 move into engagement with cam surface 552 of top diverter 548 at about location "x" to facilitate unnecessary wear of the contoured portion of divert pins 252.

Once through switch 530 (54b or 54c) cam followers 262 will either follow divert tracks 390a (FIG. 3) proceeding through cross-over switch 410 and thereafter along divert track 390b to guide packages such as package I through pusher assemblies 52-I (no longer seen in FIG. 3) onto divert track 72; or to follow divert track 400a, through cross-over switch 410 and thereafter along divert track 400b to guide packages such as package III (through pusher assemblies 52-III) onto divert track 74.

Electronic control circuitry is connected to motor 584 and provides an initial high energy pulse of current of an amplitude and duration sufficient to cause rapid movement of gate 580, but less than enough to cause permanent damage to motor 584. Such a pulse might vary greatly as to voltage and duration depending on the requirements of motor 584, as well as waveform, but in the present embodiment might reasonably be about 48 volts DC as a pulse applied for from ten to well over fifty milliseconds, followed by the application of a holding voltage ranging from five volts DC to possibly about twenty volts DC, with the preferred voltage being about seven volts DC in the current embodiment. A conventional sensing device, such as a proximity detector (not shown) or photo-eye (not shown) or other device may be located proximate conveyor 40 in a position to sense the location of pusher assemblies 52, slats 130, wheels 262, side plates 136, 140 or other parts of apron 44 capable of producing a timing signal for electronic controls as apron 44 travels around conveyor frame assembly 42. Also another electronic signal may be provided by a conventional bar code reader, laser scanner, manual control, or other external source such as a computer, etc., properly located which may be utilized in conjunction with the aforementioned timing signal and provided to the electronic control to provide a switching signal to motor 584 at the precise instant required to cause gate 580 to move from one position to the other in between divert pins 252 as they are moving through switching means 54b or 54c. Alternatively, the switching signal may be timed so that motor 584 moves gate 580 from one position to the other early, before the divert pin 252 which is at that instant being switched has moved out of contact with gate 580 and into contact with divert blade 554, or exit pin guide 536. Under these conditions, when moving from the straight position of FIG. 14 to the divert position of FIG. 16 gate 580 will follow pin 252 and move over as guide pin 252 moves out of the way. Where switching is from divert to straight path M, gate 580 will also follow pin 252 but may also deflect the pusher assembly 52, by moving to the straight position before pin 252 has cleared gate 580.

Figure 17:
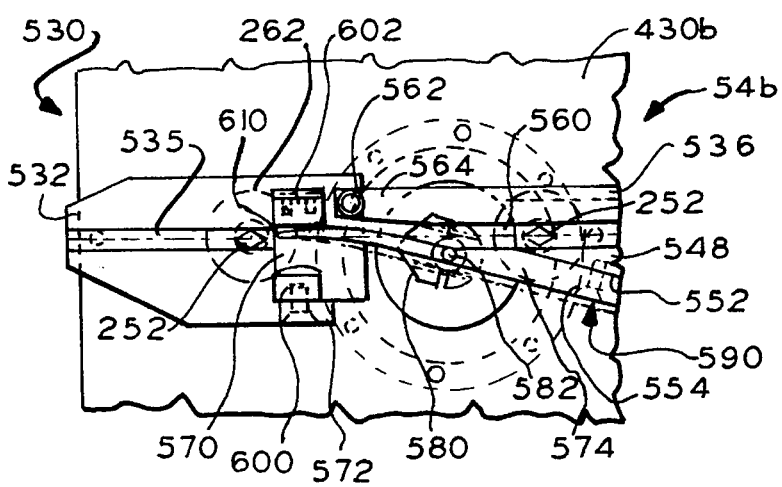
FIG. 17 is a plan view of a portion of the divert switch of FIGS. 14–15 showing switch components not fully disposed to direct a package pusher into a divert path.

FIG. 17 shows gate 580 in an intermediate position between straight path M and divert path D as might be the situation if the gate 580 were to move in a manner inconsistent with its normally expected operation. Under these conditions divert pins 252 could contact a leading point 610 of gate 580 while gate 580 is still in an intermediate position. In the case of the prior art where round divert pins were used the probability of divert pin damage or breakage would be high, as well as the probability of damage to other switch and/or conveyor parts. However, the range of relative positions between the divert pin 252 and gate 580 which could result in damage has been decreased significantly by the use of the present football shaped divert pins 252 since the force vectors acting upon divert pins 252 and gate 580 will in most cases cause the pins 252 and gate 580 to slide past each other, in relative terms, it being understood that gate 580 is not free to move longitudinally, but only to pivot about its axis of rotation, whereby the force vectors generated by the interaction of the contacting radiuses of the contoured portion of divert guide pins 252 and tip 610 of gate 580 will tend to rotate gate 580 about its axis of rotation so that it moves towards either the divert or straight position sufficiently far to allow the passage of divert pins 252 through divert switches 54b or 54c. Said interaction may also cause movement of divert pins 252 with their associated pusher assemblies 52 in a direction perpendicular to the longitudinal direction of conveyor 40 such that divert pins 252 and their associated pushers 252 move laterally across conveyor 40 a small distance in relation to the switch assembly thereby assisting in providing sufficient clearance for divert pins 252 to move past gate 580 in either the straight path M or the divert path D through the switch. It will be noted that tip 610 of gate 580 is offset from the longitudinal centerline of gate 580, which longitudinal centerline passes through the center of rotation of gate 580. This offset would necessarily need to be taken into account in computing force vectors action upon tip 610 of gate 580 and upon divert pins 252. Said offset likewise must be taken into account in determining the centerline of contacting radii between gate 580 and divert pins 252. Said offset would further assist to rotate gate 580 to the divert position II in the event of a collision between gate 580 and divert pins 252.

Figure 20:
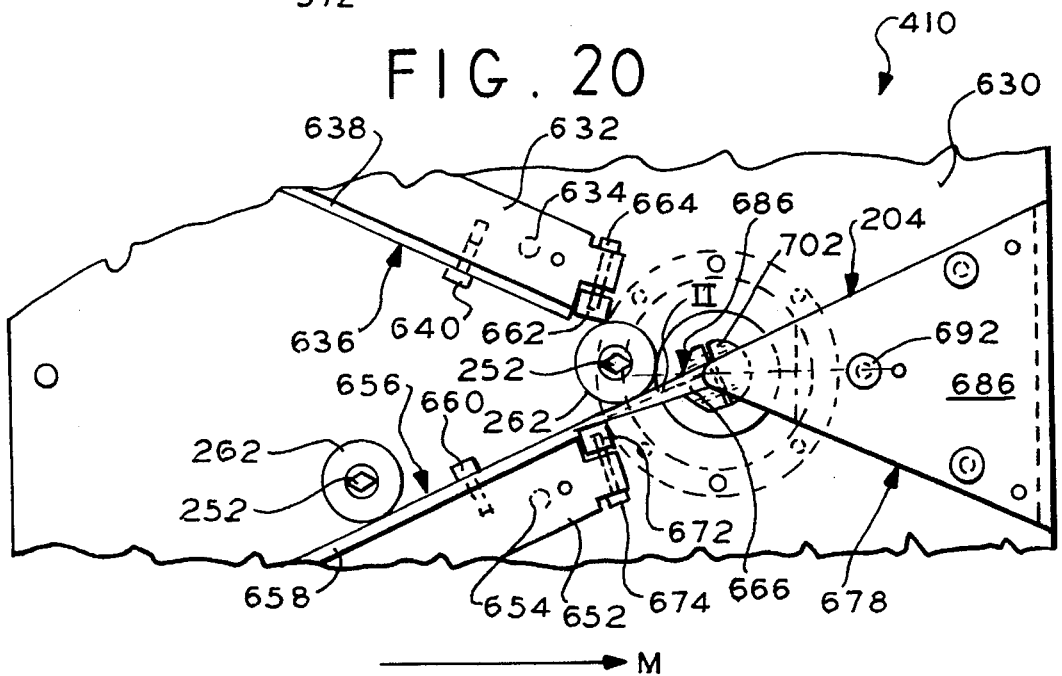
FIG. 20 is a plan view of a portion of the cross-over switch of FIGS. 18–19 but showing switch components disposed to direct package pushers into a path opposite to that shown in FIG. 18.
Figure 18:
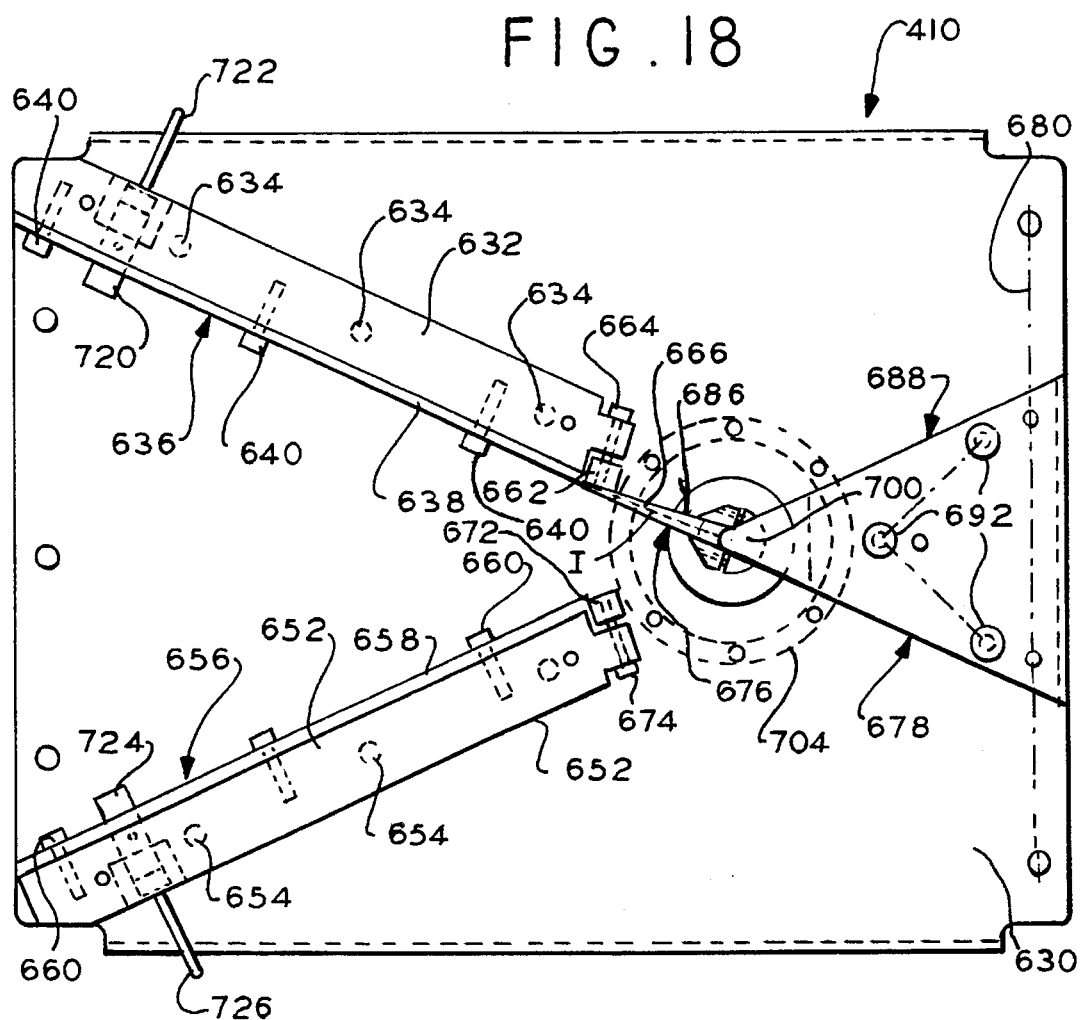
FIG. 18 is a plan view of a cross-over switch for a sortation conveyor, such as that of FIGS. 1–4, incorporating the instant invention.
Figure 19:
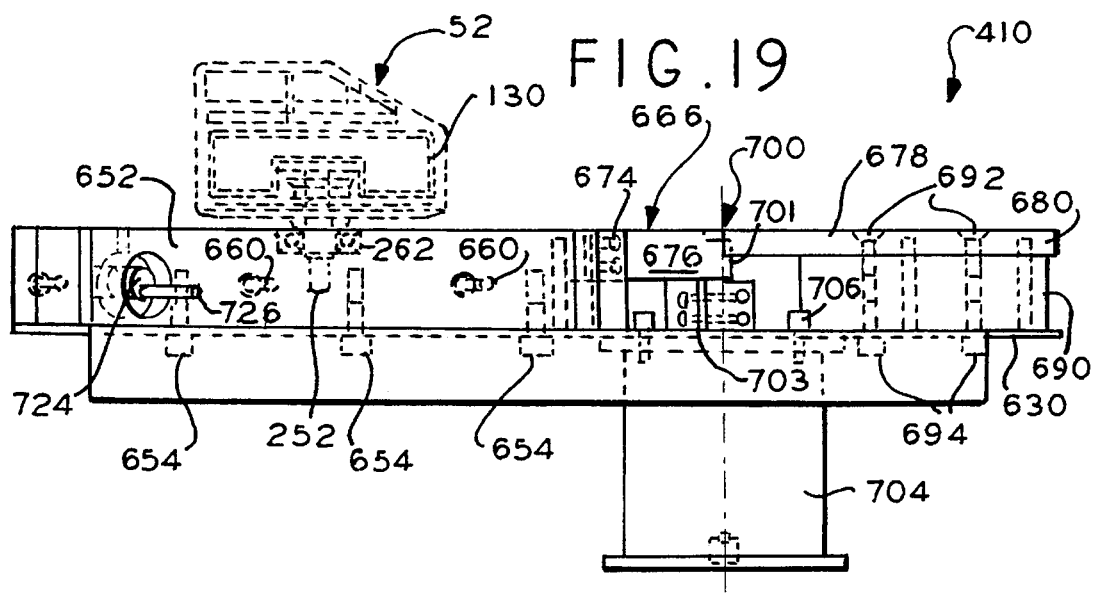
FIG. 19 is side elevational view of the cross-over switch of FIG. 18.

Cross-over switch 410 (FIGS. 3 and 18–20) is carried by a switch plate 630 mounted by and between at least a pair of cross-members 104 (FIG. 3) of frame assembly 42. A first cam guide rail mounting block 632 (FIGS. 18 and 20) is secured to plate 630 by suitable means, such as threaded members 634 or the like, so as to align a cam surface 636 of a cam guide rail facing 638 with the surface of a divert track, such as divert track 390a (FIG. 3). Facing 638 (FIGS. 18 and 20) is secured to block 632 by suitable means such as threaded members 640 or the like which are disposed in positions so as not to interfere with the coaction between cam rollers 262 and surface 656 of facing 658. A second cam guide rail mounting block 652 (FIGS. 18–20) is secured to plate 630 by suitable means, such as threaded members 654 or the like, so as to align a cam surface 656 (FIGS. 18 and 20) of a cam guide rail facing 658 with the surface of a divert track, such as divert track 400a (FIG. 3). Facing 658 (FIGS. 18 and 20) is secured to block 652 by suitable means such as threaded members 660 or the like which are disposed in positions so as not to interfere with the coaction between cam rollers 262 and surface 656 of facing 658. A bumper 662 is secured to block 632 by a threaded member 664, or the like, for coaction with a gate switch blade 666 in a disposition I thereof as shown in FIG. 18; while a similar bumper 672 is secured to block 652 by a thread member 674, or the like, for coaction with blade 666 in a dispositon II thereof as shown in FIG. 20. Bumpers 662, 672 are formed of materials and for purposes similar to bumpers 600, 602 of the switch of FIGS. 14–17. The faces of bumpers 662, 672 are disposed at an angle, with respect to caming surfaces 636, 656, so as to accommodate a substantially triangular cross-section for gate 666 such that a smooth path is formed from surface 636 across a surface 676 (FIG. 18) of gate 666 while in its disposition I and onto and across a surface 678 of a "V" guide 680, or alternatively from surface 656 across a surface 686 of gate 666 while in its disposition II and onto and across a surface 688 of "V" guide 680. A plurality of threaded members 692, or the like, secure "V" guide 680 atop a "V" guide mounting block 690 which is, in turn, secured by a number of threaded members 694, or the like, to plate 630. Surfaces 678 and 688 of "V" guide, in turn, align with the cam surfaces of guide tracks 390*b* and 400*b* respectively.

A projection 700 provided at the point of "V" guide 680 extends over and into a notch 701 formed in gate 666 to provide a smooth transition for the travel of cam followers 262 over surface 676, 686 of gate 666 and onto surfaces 678, 688 of "W" guide 680. Gate 666, similar to gate 580 of FIGS. 14–17, is formed with an upper gating portion and a lower attaching portion that supports the upper gating portion and, in turn, serves to connect gate 666 through a clamp assembly 702 (FIG. 19) to a shaft 703 of a limited angle motor 704 secured to plate 630 as by threaded members 706 or the like. Motor 704 is of the same type and construction and is powered and controlled in a manner similar to motor 584 of FIGS. 14–17; except that motor 704 is set to move through an angle, and to move gate 666 through an angle, corresponding to the movement requirement for gate 666 to swing between its disposition I (FIG. 18) and its disposition II (FIG. 20). A key (not shown) may be used to provide a positive locational relationship between motor shaft 703 and gate 666, thereby preventing relative rotation therebetween, such that arcuate movement of motor shaft 703 is translated to gate 666, and gate 666 moves arcwise with the centerline of motor shaft 703 as its center of rotation, it being understood that other means of attachment of gate 666 to motor 704 may be employed. Switch bumpers 662, 672 interact with gate 666 to limit the arcwise motion of gate 666 and to provide a cushion whereby said movement is brought to a stop without undue noise or wear. The lower portion of gate 666 is of a size large enough to provide adequate means of attachment of gate 666 to motor shaft 703 and extends lengthwise of gate 666 a distance sufficient to provide support for the upper portion of same. The upper portion of gate 666 (looking at the top view as seen in FIG. 18) may be made relatively as narrow as or even narrower than the diameter of motor shaft 703. Said lower portion of gate 666 additionally is constructed so that adequate clearance is provided between same and divert pin 250 as cam followers 262 interact with said upper portion of gate 666.

A first sensing device 720 (FIG. 18) of conventional construction, carried by mounting block 632 in position to sense the passage of divert guide pins 252 in proximity to block 632, is connected through a connector 722 to suitable power and to control 60; while a second sensing device 724 (FIGS. 18 and 19) also of conventional construction, carried by block 652 in position to sensing the passage of guide pins 252 in proximity to block 652, is connected through a connector 726 to suitable power and to control 60. As guide pins 252 pass sensing devices 720, 724 they trigger an electronic control circuit of control 60 which causes a timed circuit to produce a switching signal which controls the position of gate 666 by way of motor 704. If a cam follower 262 is traveling in the same direction as a previous cam follower 262 then said switching signal may consist of a holding voltage or signal. However, if a first cam follower 262 is preceded by a second cam follower 262 which is being diverted in an opposite direction, that is to say where said first cam follower was being diverted along face 688 of "V" block 680 while said preceding second cam follower 262 is to be diverted along face 678 of "V" block 680, the switching signal may consist of a full switching signal. The switching signal may take the form of a high energy pulse depending in its particulars upon the requirements of motor 704, but may in this embodiment reasonably be about 48 volts DC as a pulse applied for from ten to well over fifty milliseconds, followed by the application of a holding voltage ranging from five volts DC to possibly about twenty volts DC, with the preferred voltage about seven volts in the current embodiment.

Said switching signal may be timed so that gate 666 switches between dispositions I and II during the interval between cam followers 262 when not in operative contact with same, or said signal may be timed early such that gate 666 begins movement to the opposite position while still in contact with the preceding cam follower 262. In this condition gate 666 will "follow" said preceding cam follower 262 moving to said opposite disposition as rapidly as the interaction therebetween will allow. If the pusher assembly 52 of said preceding cam follower 262 is lightly loaded, gate 666 may also deflect the pusher assembly 52, by moving to said opposite position before cam follower 262 has cleared gate 666.

The electronic control circuit is timed and will respond accordingly when cam follower 262 triggers a sensing device 720, 724 so that gate 666 moves to its opposite disposition,such that said cam follower 262 has had time to move so that it is the next cam follower 262 to operatively contact gate 666 after gate 666 has moved to the position triggered by said cam follower 262. Said electronic control circuitry may also interact with divert switch controls such that gaps may be created between groups of pusher assemblies 52 diverting left and right, in that one or more pusher assemblies 52 may be allowed to continue in a straight path down the side of conveyor apron 44 whenever a divert is switched from left to right or right to left. In this way a larger gap or spacing may be created between groups of pusher assemblies 52 being diverted in opposite directions, thereby allowing more time for gate 666 to switch, without risk of collision between its tip and a cam follower 262.

From the above description it will thus be seen that there has been provided a new and novel sortation conveyor and new and novel devices and components for sortation conveyors including new and novel conveying members and conveying member/package pusher assemblies as well as new and novel guide pins for such pusher assemblies including the mounting and disposition of such guide pins in such pusher assemblies and further including a new and novel pneumatic linear actuated divert switch as well as a new and novel limited angle motor actuated divert switch and crossover switch.

It is understood that although I have shown the preferred embodiments of my invention that various modifications may be made in the details thereof without departing from the spirit as comprehended by the following claims.

What is claimed is:

1. A divert switch, for use with a sortation conveyor having a frame means and a plurality of conveying members disposed in an interconnected endless loop on the frame means and driven by drive means to convey packages along a first conveying path from an input end of the sortation conveyor towards an output end thereof, with at least one divert or spur conveyor means extending from the first conveying path into a second conveying path; each conveying member carrying a package diverter means each including a guide/divert pin means and cam follower means extending downwardly therefrom, with at least one guide track carried by the frame means and disposed to coact with the guide/divert pin means to guide package diverter means associated therewith along the first conveying path and with at least one divert track carried by the frame means and extending at a predetermined angle from a position proximate the guide track and disposed to coact with the cam follower pin means to guide associated package diverter means to direct packages towards and onto the divert or spur conveyor; comprising:

(a) mounting means for mounting divert switch means proximate the position where the divert track extends from the guide track;

(b) first pin guide means carried by said mounting means, disposed to received guide/divert pins from the guide track and to direct such guide/divert pins and their associated package diverters through a first pathway through said divert switch means and back into the guide track;

(c) second pin guide means carried by said mounting means and extending from said first pin guide means to receive guide/divert pins from said first pin guide means and to direct such guide/divert pins and their associated package diverters through a second pathway through said divert switch means and thereafter their cam follower means into coaction with the divert track;

(d) switch means carried by said mounting means where said second pin guide means extends from said first pin guide means and having a first disposition permitting guide/divert pins to follow said first pathway and a second disposition preventing guide/divert pins from following said first pathway through said divert switch means and directing the guide/divert pins into said second pathway;

(e) switch mounting means mounting said switch means for movement in a linear path between said first disposition thereof and said second disposition thereof;

(f) motive means coacting with said switch means to move said switch means between said first disposition thereof and said second disposition thereof;

(g) said switch means being disposed for movement through a space disposed between said first pin guide means and said second pin guide means; and (h) a guide rail spanning said space to facilitate movement of the guide/divert pins along said first pathway.

2. The divert switch of claim 1, wherein said motive means comprises a linear actuator.

3. The divert switch of claim 2, wherein said linear actuator is pneumatic operated.

4. The divert switch of claim 3 wherein said linear actuator is bi-directional.

5. The divert switch of claim 4, wherein said linear actuator includes pneumatic valve means and at least an electrical coil for operating said valve means and energized with an energy pulse of a selected amount for a selected period.

6. The divert switch of claim 1, wherein the divert/guide pin means and cam follower means are carried by their respective package diverters so as to extend a relatively short distance therebelow.

7. A cross-over switch, for use with a sortation conveyor having a frame means and a plurality of conveying members disposed in an interconnected endless loop on the frame means and driven by drive means to convey packages along a first conveying path from an input end of the sortation conveyor towards an output end thereof, with at least a pair of divert or spur conveyor means extending from the first conveying path into second and third conveying paths; each conveying member carrying a package diverter means each including a guide/divert pin means and cam follower means extending downwardly therefrom, with at least a pair of guide tracks carried by the frame means and disposed proximate opposite sides thereof to coact with the guide/divert pin means to guide package diverter means associated therewith along the first conveying path and with a first divert track carried by the same frame means and extending from a position proximate one of the guide tracks and disposed to coact with cam follower means to guide associated package diverter means to direct packages towards and onto the divert or spur conveyor for the second conveying path and with a second divert track carried by the frame means and extending from a position proximate the other guide track and disposed to coact with cam follower means to guide associated package diverter means to direct packages toward and onto the divert or spur conveyor for the third conveying path, the first and second divert tracks crossing at a cross-over location, the cross-over switch; comprising:

(a) mounting means for mounting cross-over switch means at the cross-over location;

(b) first cam follower guide means carried by said mounting means and disposed to coact with cam follower means from the first divert track and to direct such cam follower means and their associated package diverters through a first pathway through said crossover switch means and back into coaction with the first divert track;

(c) second cam follower guide means carried by said mounting means and disposed to coact with cam follower means from the second divert track and to direct such cam follower means and their associated package diverters through a second pathway through said crossover switch means and back into coaction with the second divert track;

(d) said first cam follower guide means and said second cam follower guide means intersecting at a switch location;

(e) switch means carried by said mounting means at said switch location and having a first disposition permitting cam follower means to follow said first pathway and a second disposition permitting cam follower means to follow said second pathway;

(f) switch mounting means mounting said switch means for movement in an arcuate path between said first disposition thereof and said second disposition thereof;

(g) motive means coacting with said switch means to move said switch means between said first disposition thereof; and (h) the conveying members being each of generally inverted "U" shaped configuration with each carrying a package diverter for sliding movement thereacross and with at least a portion of the guide/divert pin means and cam follower means being carried by the package diverter extending into an opening between the legs of the "U" to provide a relatively high disposition for the guide/divert means and cam follower means with respect to a centerline through the conveying member.

8. A sortation conveyor; comprising:

(a) a frame means;

(b) a plurality of conveying members disposed in an interconnected endless loop on frame means and driven by drive means to convey packages along a first conveying path from an input end of the sortation conveyor towards an output end thereof;

(c) at least one divert or spur conveyor means extending from first conveying path into a second conveying path;

(d) each conveying member carrying a package diverter means each including a guide/divert pin means and cam follower means extending downwardly therefrom;

(e) at least one guide track carried by the frame means and disposed to coact with the guide/divert pin means to guide package diverter means associated therewith along the first conveying path;

(f) at least one divert track carried by the frame means and extending at a predetermined angle from a position proximate said guide track and disposed to coact with the cam follower pin means to guide associated package diverter means to direct packages towards and onto said divert or spur conveyor;

(g) mounting means for mounting divert switch means proximate the position where the divert track extends from the guide track;

(h) first pin guide means carried by said mounting means, disposed to received guide/divert pins from the guide track and to direct such guide/divert pins and their associated package diverters through a first pathway through said divert switch means and back into the guide track;

(i) second pin guide means carried by said mounting means and extending from said first pin guide means to receive guide/divert pins from said first pin guide means and to direct such guide/divert pins and their associated package diverters through a second pathway through said divert switch means and thereafter their cam follower means into coaction with the divert track;

(j) switch means carried by said mounting means where said second pin guide means extends from said first pin guide means and having a first disposition permitting guide/divert pins to follow said first pathway and a second disposition preventing guide/divert pins from following said first pathway through said divert switch means and directing the guide/divert pins into said second pathway;

(k) switch mounting means mounting said switch means for movement in a linear path between said first disposition thereof and said second disposition thereof;

(l) motive means coacting with said switch means to move said switch means between said first disposition thereof and said second disposition thereof; and (m) the divert/guide pins each being formed with a football-like cross-section to facilitate passage through said switch means.

9. A sortation conveyor; comprising:

(a) a frame means;

(b) a plurality of conveying members disposed in an interconnected endless loop on frame means and driven by drive means to convey packages along a first conveying path from an input end of the sortation conveyor towards an output end thereof;

(c) at least one divert or spur conveyor means extending from first conveying path into a second conveying path;

(d) each conveying member carrying a package diverter means each including a guide/divert pin means and cam follower means extending downwardly therefrom;

(e) at least one guide track carried by the frame means and disposed to coact with the guide/divert pin means to guide package diverter means associated therewith along the first conveying path;

(f) at least one divert track carried by the frame means and extending at a predetermined angle from a position proximate said guide track and disposed to coact with the cam follower pin means to guide associated package diverter means to direct packages towards and onto said divert or spur conveyor;

(g) mounting means for mounting divert switch means proximate the position where the divert track extends from the guide track;

(h) first pin guide means carried by said mounting means, disposed to received guide/divert pins from the guide track and to direct such guide/divert pins and their associated package diverters through a first pathway through said divert switch means and back into the guide track;

(i) second pin guide means carried by said mounting means and extending from said first pin guide means to receive guide/divert pins from said first pin guide means and to direct such guide/divert pins and their associated package diverters through a second pathway through said divert switch means and thereafter their cam follower means into coaction with the divert track;

(j) switch means carried by said mounting means where said second pin guide means extends from said first pin guide means and having a first disposition permitting guide/divert pins to follow said first pathway and a second disposition preventing guide/divert pins from following said first pathway through said divert switch means and directing the guide/divert pins into said second pathway;

(k) switch mounting means mounting said switch means for movement in a linear path between said first disposition thereof and said second disposition thereof;

(l) motive means coacting with said switch means to move said switch means between said first disposition thereof and said second disposition thereof; and (m) the conveying members each being of generally inverted "U" shaped configuration and each carrying a package diverter for sliding movement thereacross with at least a portion of the guide/divert extending into an opening between the legs of the "U" to provide a relatively high disposition for the guide/divert pin means and cam follower means with respect to a centerline through the conveying member.

10. A sortation conveyor; comprising:

(a) a frame means;

(b) a plurality of conveying members disposed in an interconnected endless loop on frame means and driven by drive means to convey packages along a first conveying path from an input end of the sortation conveyor towards an output end thereof;

(c) at least a pair of divert or spur conveyor means extending from first conveying path into second and third conveying paths;

(d) each conveying member carrying a package diverter means each including a guide/divert pin means and cam follower means extending downwardly therefrom;

(e) at least a pair of guide tracks carried by the frame means and disposed proximate opposite sides thereof to coact with the guide/divert pin means to guide package diverter means associated therewith along the first conveying path;

(f) a first divert track carried by the same frame means and extending at a predetermined angle from a position proximate one of the guide tracks and disposed to coact with cam follower means to guide associated package diverter means to direct packages towards and onto the divert or spur conveyor for the second conveyor path;

(g) a second divert track carried by the frame means and extending from a position proximate the other guide track an disposed to coact with cam follower means to guide-associated package diverter means to direct packages towards and onto the divert or spur conveyor for the third conveying path;

(h) said first and second divert tracks crossing at a cross-over location;

(i) a cross-over switch means;

(j) cross-over switch mounting means for mounting said cross-over switch means at said cross-over location;

(k) first cam follower guide means carried by said cross-over switch mounting means and disposed to coact with cam follower means from the first divert track and to direct such cam follower means and their associated package diverters through a first pathway through said cross-over switch means and back into coaction with the first divert track;

(l) second cam follower guide means carried by said cross-over switch mounting means and disposed to coact with cam follower means from the second divert track and to diverters through a second pathway through said cross-over switch means and back into coaction with the second divert track;

(m) mounting means for mounting divert switch means proximate the position where the divert track extends from the guide track;

(n) first pin guide means carried by said mounting means, disposed to received guide/divert pins from the guide track and to direct such guide/divert pins and their associated package diverters through a first pathway through said divert switch means and back into the guide track;

(o) second pin guide means carried by said mounting means and extending from said first pin guide means to receive guide/divert pins from said first pin guide means and to direct such guide/divert pins and their associated package diverters through a second pathway through said divert switch means and thereafter their cam follower means into coaction with the divert track;

(p) switch means carried by said mounting means where said second pin guide means extends from said first pin guide means and having a first disposition permitting guide/divert pins to follow said first pathway and a second disposition preventing guide/divert pins from following said first pathway through said divert switch means and directing the guide/divert pins into said second pathway;

(q) switch mounting means mounting said switch means for movement in a linear path between said first disposition thereof and said second disposition thereof; and (r) motive means coacting with said switch means to move said switch means between said first disposition thereof and said second disposition thereof; and (s) the divert/guide pins being formed with a football-like cross-sectional configuration to facilitate passage through said switch means.

11. A divert switch, for use with a sortation conveyor having a frame means and a plurality of conveying members disposed in an interconnected endless loop on the frame means and driven by drive means to convey packages along a first conveying path from an input end of the sortation conveyor towards an output end thereof, with at least one divert or spur conveyor means extending from the first conveying path into a second conveying path; each conveying member carrying a package diverter means each including a guide/divert pin means and cam follower means extending downwardly therefrom, with at least one guide track carried by the frame means and disposed to coact with the guide/divert pin means to guide package diverter means associated therewith along the first conveying path and with at least one divert track carried by the frame means and extending at a predetermined angle from a position proximate the guide track and disposed to coact with the cam follower means to guide associated package diverter means to direct packages towards and onto the divert or spur conveyor means; comprising:

(a) mounting means for mounting divert switch means proximate the position where the divert track extends from the guide track;

(b) first pin guide means carried by said mounting means, disposed to receive guide/divert pin means from the guide track and to direct such guide/divert pin means and their associated package diverter means through a first pathway through said divert switch means and back into the guide track;

(c) second pin guide means carried by said mounting means and extending from said first pin guide means to receive guide/divert pin means from said first pin guide means and to direct such guide/divert pin means and their associated package diverter means through a second pathway through said divert switch means and thereafter their cam follower means into coaction with the divert track;

(d) switch means carried by said mounting means where said second pin guide means extends from said first pin guide means and having a first disposition permitting guide/divert pin means to follow said first pathway and a second disposition preventing guide/divert pin means from following said first pathway through said divert switch means and directing the guide/divert pin means into said second pathway;

(e) switch mounting means mounting said switch means for movement in an arcuate path between said first disposition thereof and said second disposition thereof; and (f) motive means comprising a limited angle of movement motor coacting with said switch means to move said switch means between said first disposition thereof and said second disposition thereof.

12. The divert switch of claim 11, wherein said motor is operated by direct current.

13. The divert switch of claim 12, wherein said motor is bi-directional.

14. The divert switch of claim 13, wherein said motor is actuated with an energy pulse of a first selected amount for a selected period and thereafter held by an energy pulse of a second selected amount that is less than said first selected amount.

15. The divert switch of claim 14, wherein a projection extends from said second pin guide means into a recess of said switch means.

16. A divert switch, for use with a sortation conveyor having a frame means and a plurality of conveying members disposed in an interconnected endless loop on the frame means and driven by drive means to convey packages along a first conveying path from an input end of the sortation conveyor towards an output end thereof, with at least one divert or spur conveyor means extending from the first conveying path into a second conveying path; each conveying member carrying a package diverter means each including a guide/divert pin means and cam follower means extending downwardly therefrom, with at least one guide track carried by the frame means and disposed to coact with the guide/divert pin means to guide package diverter means associated therewith along the first conveying path and with at least one divert track carried by the frame means and extending at a predetermined angle from a position proximate the guide track and disposed to coact with the cam follower pin means to guide associated package diverter means to direct packages towards and onto the divert or spur conveyor; comprising:

(a) mounting means for mounting divert switch means proximate the position where the divert track extends from the guide track;

(b) first pin guide means carried by said mounting means, disposed to receive guide/divert pins from the guide track and to direct such guide/divert pins and their associated package diverters through a first pathway through said divert switch means and back into the guide track;

(c) second pin guide means carried by said mounting means and extending from said first pin guide means to receive guide/divert pins from said first pin guide means and to direct such guide/divert pins and their associated package diverters through a second pathway through said divert switch means and into thereafter their cam follower means into coaction with the divert track;

(d) switch means carried by said mounting means where said second pin guide means extends from said first pin guide means and having a first disposition permitting guide/divert pins to follow said first pathway and a second disposition preventing guide/divert pins from following said first pathway through said divert switch means and directing the guide/divert pins into said second pathway;

(e) switch mounting means mounting said switch means for movement in an arcuate path between said first disposition thereof and said second disposition thereof; and (f) motive means coacting with said switch means to move said switch means between said first disposition thereof and said second disposition thereof.

17. The divert switch of claim 16 including bumper means disposed to coact with said switch means to arrest and soften the movement thereof.

18. The divert switch of claim 16, wherein the divert/guide pins are formed with a football-like cross-sectional configuration to facilitate passage through said switch means.

19. The divert switch of claim 16, wherein the divert/guide pin means and cam follower means are carried by their respective package diverters so as to extend a relatively short distance therebelow.

20. The divert switch of claim 16, wherein the conveying members are each of generally inverted "U" configuration each carrying a package diverter for sliding movement thereacross and wherein at least a portion of the guide/divert pin means and cam follower means carried by the package diverter extends into an opening between the legs of the "U" to provide a relatively high disposition for the guide/divert pin means and cam follower means with respect to a centerline through the conveying member.

21. A cross-over switch, for use with a sortation conveyor having a frame means and a plurality of conveying members disposed in an interconnected endless loop on the frame means and driven by drive means to convey packages along a first conveying path from an input end of the sortation conveyor towards an output end thereof, with at least a pair of divert or spur conveyor means extending from the first conveying path into second and third conveying paths; each conveying member carrying a package diverter means each including a guide/divert pin means and cam follower means extending downwardly therefrom, with at least a pair of guide tracks carried by the frame means and disposed proximate opposite sides thereof to coact with the guide/divert pin means to guide package diverter means associated therewith along the first conveying path and with a first divert track carried by the same frame means and extending from a position proximate one of the guide tracks and disposed to coact with cam follower means to guide associated package diverter means to direct packages towards and onto the divert or spur conveyor for the second conveying path and with a second divert track carried by the frame means and extending from a position proximate the other guide track and disposed to coact with cam follower means to guide associated package diverter means to direct packages towards and onto the divert or spur conveyor for the third conveying path, the first and second divert tracks crossing at a cross-over location, the cross-over switch; comprising:

(a) mounting means for mounting cross-over switch means at the cross-over location;

(b) first cam follower guide means carried by said mounting means and disposed to coact with the cam follower means from the first divert track and to direct such cam follower means and their associated package diverters through a first pathway through said cross-over switch means and back into coaction with the first divert track;

(c) second cam follower guide means carried by said mounting means and disposed to coact with cam follower means from the second divert track and to direct such cam follower means and their associated package diverters through a second pathway through said cross-over switch means and back into coaction with the second divert track;

(d) said first cam follower guide means and said second cam follower guide means intersecting at a switch location;

(e) switch means carried by said mounting means at said switch location and having a first disposition permitting cam follower means to follow said first pathway and a second disposition permitting cam follower means to follow said second pathway;

(f) switch mounting means mounting said switch means for movement in an arcuate path between said first disposition thereof and said second disposition thereof; and (g) motive means comprising a limited angle of movement motor, coacting with said switch means to move said switch means between said first disposition thereof and said second disposition thereof.

22. The cross-over switch of claim 21, wherein said motor is operated by direct current.

23. The cross-over switch of claim 22, wherein said motor is bi-directional.

24. The cross-over switch of claim 23, wherein said motor is actuated with an energy pulse of a first selected amount for a selected period and thereafter held by an energy pulse of a second selected amount that is less than said first selected amount.

25. The cross-over switch of claim 24, wherein a projection extends from said second pin guide means into a recess of said switch means.

26. A sortation conveyor; comprising:

(a) a frame means;

(b) a plurality of conveying members disposed in an interconnected endless loop on frame means and driven by drive means to convey packages along a first conveying path from an input end of the sortation conveyor towards an output end thereof;

(c) at least a pair of divert or spur conveyor means extending from first conveying path into second and third conveying paths;

(d) each conveying member carrying a package diverter means each including a guide/divert pin means and cam follower means extending downwardly therefrom;

(e) at least a pair of guide tracks carried by the frame means and disposed proximate opposite sides thereof to coact with the guide/divert pin means to guide package diverter means associated therewith along the first conveying path;

(f) a first divert track carried by the same frame means and extending at a predetermined angle from a position proximate one of the guide tracks and disposed to coact with cam follower means to guide associated package diverter means to direct packages towards and onto the divert or spur conveyor for the second conveyor path;

(g) a second divert track carried by the frame means and extending from a position proximate the other guide track an disposed to coact with cam follower means to guide-associated package diverter means to direct packages towards and onto the divert or spur conveyor for the third conveying path;

(h) said first and second divert tracks crossing at a cross-over location;

(i) a cross-over switch means;

(j) cross-over switch mounting means for mounting said cross-over switch means at said cross-over location;

(k) first cam follower guide means carried by said cross-over switch mounting means and disposed to coact with cam follower means from the first divert track and to direct such cam follower means and their associated package diverters through a first pathway through said cross-over switch means and back into coaction with the first divert track;

(l) second cam follower guide means carried by said cross-over switch mounting means and disposed to coact with cam follower means from the second divert track and to direct such cam follower means and their associated package diverters through a second pathway through said cross-over switch means and back into coaction with the second divert track;

(m) mounting means for mounting divert switch means proximate the position where the divert track extends from the guide track;

(n) first pin guide means carried by said mounting means, disposed to received guide/divert pins from the guide track and to direct such guide/divert pins and their associated package diverters through a first pathway through said divert switch means and back into the guide track;

(o) second pin guide means carried by said mounting means and extending from said first pin guide means to receive guide/divert pins from said first pin guide means and to direct such guide/divert pins and their associated package diverters through a second pathway through said divert switch means and thereafter their cam follower means into coaction with the divert track;

(p) switch means carried by said mounting means where said second pin guide means extends from said first pin guide means and having a first disposition permitting guide/divert pins to follow said first pathway and a second disposition preventing guide/divert pins from following said first pathway through said divert switch means and directing the guide/divert pins into said second pathway;

(q) switch mounting means mounting said switch means for movement in a linear path between said first disposition thereof and said second disposition thereof;

(r) motive means coacting with said switch means to move said switch means between said first disposition thereof and said second disposition thereof; and (s) the conveying members each being of generally inverted "U" shaped configuration each carrying a package diverter for sliding movement thereacross with at least a portion of the guide/divert pin means and cam follower means carried by the package diverter extending into an opening between the legs of the "U" to provide a relatively high disposition for the guide/divert pin means and cam follower means with respect to a centerline through the conveying member.

27. A divert switch, for use with a sortation conveyor having a frame means and a plurality of conveying members disposed in an interconnected endless loop on the frame means and driven by drive means to convey packages along a first conveying path from an input end of the sortation conveyor towards an output end thereof, with at least one divert or spur conveyor means extending from the first conveying path into a second conveying path; each conveying member carrying a package diverter means each including a guide/divert pin means and cam follower means extending downwardly therefrom, with at least one guide track carried by the frame means and disposed to coact with the guide/divert pin means to guide package diverter means associated therewith along the first conveying path and with at least one divert track carried by the frame means and extending at a predetermined angle from a position proximate the guide track and disposed to coact with the cam follower pin means to guide associated package diverter means to direct packages towards and onto the divert or spur conveyor; comprising:

(a) mounting means for mounting divert switch means proximate the position where the divert track extends from the guide track;

(b) first pin guide means carried by said mounting means, disposed to received guide/divert pins from the guide track and to direct such guide/divert pins and their associated package diverters through a first pathway through said divert switch means and back into the guide track;

(c) second pin guide means carried by said mounting means and extending from said first pin guide means to receive guide/divert pins from said first pin guide means and to direct such guide/divert pins and their associated package diverters through a second pathway through said divert switch means and thereafter their cam follower means into coaction with the divert track;

(d) switch means carried by said mounting means where said second pin guide means extends from said first pin guide means and having a first disposition permitting guide/divert pins to follow said first pathway and a second disposition preventing guide/divert pins from following said first pathway through said divert switch means and directing the guide/divert pins into said second pathway;

(e) switch mounting means mounting said switch means for movement in a linear path between said first disposition thereof and said second disposition thereof; and (f) motive means coacting with said switch means to move said switch means between said first disposition thereof and said second disposition thereof;

(g) the divert/guide pins being formed with a football-like cross-sectional configuration to facilitate passage through said switch means.

28. A cross-over switch, for use with a sortation conveyor having a frame means and a plurality of conveying members disposed in an interconnected endless loop on the frame means and driven by drive means to convey packages along a first conveying path from an input end of the sortation conveyor towards an output end thereof, with at least a pair of divert or spur conveyor means extending from the first conveying path into second and third conveying paths; each conveying member carrying a package diverter means each including a guide/divert pin means and cam follower means extending downwardly therefrom, with at least a pair of guide tracks carried by the frame means and disposed proximate opposite sides thereof to coact with the guide/divert pin means to guide package diverter means associated therewith along the first conveying path and with a first divert track carried by the same frame means and extending from a position proximate one of the guide tracks and disposed to coact with cam follower means to guide associated package diverter means to direct packages towards and onto the divert or spur conveyor for the second conveying path and with a second divert track carried by the frame means and extending from a position proximate the other guide track and disposed to coact with cam follower means to guide associated package diverter means to direct packages toward and onto the divert or spur conveyor for the third conveying path, the first and second divert tracks crossing at a cross-over location, the cross-over switch; comprising:

(a) mounting means for mounting cross-over switch means at the cross-over location;

(b) first cam follower guide means carried by said mounting means and disposed to coact with cam follower means from the first divert track and to direct such cam follower means and their associated package diverters through a first pathway through said crossover switch means and back into coaction with the first divert track;

(c) second cam follower guide means carried by said mounting means and disposed to coact with cam follower means from the second divert track and to direct such cam follower means and their associated package diverters through a second pathway through said cross-over switch means and back into coaction with the second divert track;

(d) said first cam follower guide means and said second cam follower guide means intersecting at a switch location;

(e) switch means carried by said mounting means at said switch location and having a first disposition permitting cam follower means to follow said first pathway and a second disposition permitting cam follower means to follow said second pathway;

(f) switch mounting means mounting said switch means for movement in an arcuate path between said first disposition thereof and said second disposition thereof;

(g) the divert/guide pins being formed with a football-like cross-sectional configuration to facilitate passage through said switch means; and (h) motive means coacting with said switch means to move said switch means between said first disposition thereof and said second disposition thereof.

29. The cross-over switch of claim 28, including bumper means disposed to coact with said switch means to arrest and soften the movement thereof.

30. The cross-over switch of claim 28, wherein the divert/guide pin means and cam follower means are carried by their respective package diverters so as to extend a relatively short distance therebelow.

31. A guide/divert pin for a sortation conveyor having a plurality of package conveying members with a plurality of package diverters each carried by one of said package conveying members and each configured to carry a guide/divert pin to facilitate movement of the package diverters as required by the sortation conveyor, each such guide/divert pin; comprising:

(a) at least a guide/divert body;

(b) said guide/divert body having a non-cylindrical substantially football shaped cross-sectional configuration.

32. A guide/divert pin for a sortation conveyor having a plurality of package conveying members with a plurality of package diverters each carried by one of said package conveying members and each configured to carry a guide/divert pin to facilitate movement of the package diverters as required by the sortation conveyor, each such guide/divert pin; comprising:

(a) at least a guide/divert body;

(b) said guide/divert body having a non-cylindrical substantially football shaped cross-sectional configuration including a relatively small radius at leading and trailing ends of the guide/divert pin.

33. The guide/divert pin of claim 32, wherein said guide/divert pin body includes sides that are formed to relatively larger radii than said leading and trailing ends.

34. The guide/divert pin of claim 33, wherein said leading and trailing ends and said sides are connected by lines of selected configuration.

35. The guide/divert pin of claim 34 wherein said lines of selected configuration are each arcuate.

36. The guide/divert pin of claim 35, wherein said arcuate lines are at radii which are relatively larger than those of said sides.

37. A slat-like article carrying and conveying member for a sortation conveyor; comprising:

(a) body means of inverted outwardly facing substantially "U" shaped configuration of selected width and length; and (b) said body means including a pair of spaced legs each of predetermined width and connected and spanned by a bridge of predetermined thickness;

(c) said space between said legs extending substantially the entire length of each such conveying member.

38. The conveying member of claim 37, wherein said space is of a size and configuration to receive at least part of the components of a package diverting device.

39. The conveying member of claim 38, wherein said space permits a relatively high disposition of said components of said package diverting device with respect to a center of the conveying member.

40. The conveying member of claim 37, wherein said legs and bridge are hollow.

41. The conveying member of claim 37, wherein said legs each include outside walls that taper inwardly from top and bottom thereof.

42. The conveying member of claim 41, wherein said bridge includes a selected number of ribs extending down into said space.

43. An article conveying member and package diverter assembly for a sortation conveyor; comprising:

(a) conveying body means of substantially inverted "U" shaped configuration of selected width and length;

(b) said body mean including a pair of spaced legs each of predetermined width and connected and spanned by a bridge of predetermined thickness;

(c) package diverter means carried by said body means for sliding movement along said length thereof;

(d) said package diverter means including an opening extending therethrough of a size and configuration to closely surround said body means;

(e) a plurality of lands extending from a wall of said opening into said opening for coaction with a surface of said conveying means so that said package diverter means assumes a cocked disposition with respect to a predetermined surface of said conveying body means.

44. The assembly of claim 43, wherein said predetermined surface of said conveying means is an upper article carrying surface thereof and said package diverter means is cocked with respect thereto in the direction that said conveying body means would move when incorporated into a sortation conveyor.

45. The assembly of claim 44, wherein said lands extend down from a leading upper inner wall of said opening and extend up from a trailing lower wall of said opening.

46. The assembly of claim 45, including additional lands extending into said opening but not to the same extent as said lands that provide said cocked condition.

47. The assembly of claim 46, including a plurality of grooves with a groove disposed between said lands and said additional lands.

48. The assembly of claim 47, including guide/divert pin means carried by said package diverter means so that at least a portion thereof is disposed in said space between said legs.

49. The assembly of claim 48, including a cam follower carried by said guide/divert pin means.

50. The assembly of claim 49, wherein said guide/divert pin means includes a guide/divert pin that extends beneath said cam follower.

51. The assembly of claim 50, wherein said guide/divert pin is substantially football shaped in cross-section.

52. A sortation conveyor; comprising:

(a) a frame means;

(b) a plurality of conveying members disposed in an interconnected endless loop on frame means and driven by drive means to convey packages along a first conveying path from an input end of the sortation conveyor towards an output end thereof;

(c) at least one divert or spur conveyor means extending from first conveying path into a second conveying path;

(d) each conveying member carrying a package diverter means each including a guide/divert pin means and cam follower means extending downwardly therefrom;

(e) at least one guide track carried by the frame means and disposed to coact with the guide/divert pin means to guide package diverter means associated therewith along the first conveying path;

(f) at least one divert track carried by the frame means and extending at a predetermined angle from a position proximate said guide track and disposed to coact with the cam follower pin means to guide associated package diverter means to direct packages towards and onto said divert or spur conveyor;

(g) mounting means for mounting divert switch means proximate the position where the divert track extends from the guide track;

(h) first pin guide means carried by said mounting means, disposed to received guide/divert pins from the guide track and to direct such guide/divert pins and their associated package diverters through a first pathway through said divert switch means and back into the guide track;

(i) second pin guide means carried by said mounting means and extending from said first pin guide means to receive guide/divert pins from said first pin guide means and to direct such guide/divert pins and their associated package diverters through a second pathway through said divert switch means and thereafter their cam follower means into coaction with the divert track;

(j) switch means carried by said mounting means where said second pin guide means extends from said first pin guide means and having a first disposition permitting guide/divert pins to follow said first pathway and a second disposition preventing guide/divert pins from following said first pathway through said divert switch means and directing the guide/divert pins into said second pathway;

(k) switch mounting means mounting said switch means for movement in a linear path between said first disposition thereof and said second disposition thereof;

(l) motive means coacting with said switch means to move said switch means between said first disposition thereof and said second disposition thereof;

(m) said switch means being disposed for movement through a space disposed between said first pin guide means and said second pin guide means; and (n) a guide rail spanning said space to facilitate movement of the guide/divert pins along said first pathway.

53. The sortation conveyor of claim 52, wherein said linear actuator is pneumatic operated.

54. The sortation conveyor of claim 53, wherein said linear actuator is bi-directional.

55. The sortation conveyor of claim 52; including:

(a) at least a pair of divert or spur conveyor means extending from said first conveying path into second and third conveying paths;

(b) at least a pair of guide tracks carried by the frame means and disposed proximate opposite sides thereof to coact with the guide/divert pin means to guide package diverter means associated therewith along said first conveying path;

(c) a first divert track carried by the same frame means and extending from a position proximate one of the guide tracks and disposed to coact with cam follower means to guide associated package diverter means to direct packages towards and onto the divert or spur conveyor for the second conveying path;

(d) a second divert track carried by the frame means and extending from a position proximate the other guide track and disposed to coact with cam follower means to guide associated package diverter means to direct packages towards and onto the divert or spur conveyor for the third conveying path;

(e) said first and second divert tracks crossing at a cross-over location;

(f) a cross-over switch means;

(g) mounting means for mounting said cross-over switch means at said cross-over location;

(h) first cam follower guide means carried by said mounting means and disposed to coact with cam follower means from the first divert track and to direct such cam follower means and their associated package diverters through a first pathway through said cross-over switch means and back into coaction with the first divert track;

(i) second cam follower guide means carried by said mounting means and disposed to coact with cam follower means from the second divert track and to direct such cam follower means and their associated package diverters through a second pathway through said cross-over switch means and back into coaction with the second divert track;

(j) said first cam follower guide means and said second cam follower guide means intersecting at a switch location;

(k) switch means carried by said mounting means at said switch location and having a first disposition permitting cam follower means to follow said first pathway and a second disposition permitting cam follower means to follow said second pathway;

(l) switch mounting means mounting said switch means for movement in an arcuate path between said first disposition thereof and said second disposition thereof; and (m) motive means coacting with said switch means to move said switch means between said first disposition thereof and said second disposition thereof.

56. The sortation conveyor of claim 55, wherein the package diverters each include a cavity disposed within an underside thereof and said guide/divert pin means and cam follower means each include mounting means mounting an end thereof within said cavity and so as to extend a relatively short distance therebelow.

57. The sortation conveyor of claim 10, wherein the package diverters each include a cavity disposed within an underside thereof and said guide/divert pin means and cam follower means each include mounting means mounting an end thereof within said cavity and so as to extend a relatively short distance therebelow.

58. A divert switch, for use with a sortation conveyor having a frame means and a plurality of conveying members disposed in an interconnected endless loop on the frame means and driven by drive means to convey packages along a first conveying path from an input end of the sortation conveyor towards an output end thereof, with at least one divert or spur conveyor means extending from the first conveying path into a second conveying path; each conveying member carrying a package diverter means each including a guide/divert pin means and cam follower means extending downwardly therefrom, with at least one guide track carried by the frame means and disposed to coact with the guide/divert pin means to guide package diverter means associated therewith along the first conveying path and with at least one divert track carried by the frame means and extending at a predetermined angle from a position proximate the guide track and disposed to coact with the cam follower pin means to guide associated package diverter means to direct packages towards and onto the divert or spur conveyor; comprising:

(a) mounting means for mounting divert switch means proximate the position where the divert track extends from the guide track;

(b) first pin guide means carried by said mounting means, disposed to received guide/divert pins from the guide track and to direct such guide/divert pins and their associated package diverters through a first pathway through said divert switch means and back into the guide track;

(c) second pin guide means carried by said mounting means and extending from said first pin guide means to receive guide/divert pins from said first pin guide means and to direct such guide/divert pins and their associated package diverters through a second pathway through said divert switch means and thereafter their cam follower means into coaction with the divert track;

(d) switch means carried by said mounting means where said second pin guide means extends from said first pin guide means and having a first disposition permitting guide/divert pins to follow said first pathway and a second disposition preventing guide/divert pins from following said first pathway through said divert switch means and directing the guide/divert pins into said second pathway;

(e) switch mounting means mounting said switch means for movement in a linear path between said first disposition thereof and said second disposition thereof;

(f) motive means coacting with said switch means to move said switch means between said first disposition thereof and said second disposition thereof; and (g) the conveying members each being of generally inverted "U" shaped configuration each carrying a package diverter for sliding movement thereacross with at least a portion of the guide/divert pin means and cam follower means carried by the package diverter extending into an opening between the legs of the "U" to provide a relatively high disposition for the guide/divert pin means and cam follower means with respect to a centerline through the conveying member.

59. A divert switch, for use with a sortation conveyor having a frame means and a plurality of conveying members disposed in an interconnected endless loop on the frame means and driven by drive means to convey packages along a first conveying path from an input end of the sortation conveyor towards an output end thereof, with at least one divert or spur conveyor means extending from the first conveying path into a second conveying path; each conveying member carrying a package diverter means each including a guide/divert pin means and cam follower means extending downwardly therefrom, with at least one guide track carried by the frame means and disposed to coact with the guide/divert pin means to guide package diverter means associated therewith along the first conveying path and with at least one divert track carried by the frame means and extending at a predetermined angle from a position proximate the guide track and disposed to coact with the cam follower means to guide associated package diverter means to direct packages towards and onto the divert or spur conveyor means; comprising:

(a) mounting means for mounting divert switch means proximate the position where the divert track extends from the guide track;

(b) first pin guide means carried by said mounting means, disposed to receive guide/divert pin means from the guide track and to direct such guide/divert pin means and their associated package diverter means through a first pathway through said divert switch means and back into the guide track;

(c) second pin guide means carried by said mounting means and extending from said first pin guide means to receive guide/divert pin means from said first pin guide means and to direct such guide/divert pin means and their associated package diverter means through a second pathway through said divert switch means and thereafter their cam follower means into coaction with the divert track;

(d) switch means carried by said mounting means where said second pin guide means extends from said first pin guide means and having a first disposition permitting guide/divert pin means to follow said first pathway and a second disposition preventing guide/divert pin means from following said first pathway through said divert switch means and directing the guide/divert pin means into said second pathway;

(e) switch mounting means mounting said switch means for movement in a linear path between said first disposition thereof and said second disposition thereof; and (f) motive means coacting with said switch means to move said switch means between said first disposition thereof and said second disposition thereof;

(g) said motive means comprising a bi-directional, pneumatically operated, linear actuator;

(h) said linear actuator including pneumatic valve means and at least a pair of electrical coils for operating said valve means, each of said coils being initially energized with an energy pulse of a first selected amount for a selected period and thereafter held by an energy pulse of a second selected amount that is less than said first selected amount.

60. A sortation conveyor; comprising:

(a) a frame means;

(b) a plurality of conveying members disposed in an interconnected endless loop on said frame means and driven by drive means to convey packages along a first conveying path from an input end of the sortation conveyor towards an output end thereof;

(c) at least one divert or spur conveyor means extending from the first conveying path into a second conveying path;

(d) each conveying member carrying a package diverter means each including a guide/divert pin means and cam follower means extending downwardly therefrom;

(e) at least one guide track carried by said frame means and disposed to coact with said guide/divert pin means to guide package diverter means associated therewith along the first conveying path;

(f) at least one divert track carried by said frame means and extending at a predetermined angle from a position proximate said guide track and disposed to coact with cam follower means to guide associated package diverter means to direct packages towards and onto said divert or spur conveyor means;

(g) mounting means for mounting divert switch means proximate the position where the divert track extends from the guide track;

(h) first pin guide means carried by said mounting means, disposed to receive guide/divert pin means from the guide track and to direct such guide/divert pin means and their associated package diverter means through a first pathway through said divert switch means and back into the guide track;

(i) second pin guide means carried by said mounting means and extending from said first pin guide means to receive guide/divert pin means from said first pin guide means and to direct such guide/divert pin means and their associated package diverter means through a second pathway through said divert switch means and thereafter their cam follower means into coaction with the divert track;

(j) switch means carried by said mounting means where said second pin guide means extends from said first pin guide means and having a first disposition permitting guide/divert pin means to follow said first pathway and a second disposition preventing guide/divert pin means from following said first pathway through said divert switch means and directing the guide/divert pin means into said second pathway;

(k) switch mounting means mounting said switch means for movement in a predetermined path between said first disposition thereof and said second disposition thereof; and (l) motive means coacting with said switch means to move said switch means between said first disposition thereof and said second disposition thereof;

(m) said motive means comprising a bi-directional, pneumatically operated, linear actuator;

(n) said linear actuator including pneumatic valve means and at least a pair of electrical coils for operating said valve means, each of said coils being initially energized with an energy pulse of a first selected amount for a selected period and thereafter held by an energy pulse of a second selected amount that is less than said first selected amount.

61. A sortation conveyor; comprising:

(a) a frame means;

(b) a plurality of conveying members disposed in an interconnected endless loop on said frame means and driven by drive means to convey packages along a first conveying path from an input end of the sortation conveyor towards an output end thereof;

(c) at least one divert or spur conveyor means extending from the first conveying path into a second conveying path;

(d) each conveying member carrying a package diverter means each including a guide/divert pin means and cam follower means extending downwardly therefrom;

(e) at least one guide track carried by said frame means disposed to coact with the guide/divert pin means to guide package diverter means associated therewith along the first conveying path;

(f) at least one divert track carried by said frame means and extending at a predetermined angle from a position proximate said guide track and disposed to coact with the cam follower pin means to guide associated package diverter means to direct packages towards and onto said divert or spur conveyor means;

(g) mounting means for mounting divert switch means proximate the position where the divert track extends from the guide track;

(h) first pin guide means carried by said mounting means, disposed to receive guide/divert pin means from the guide track and to direct such guide/divert pin means and their associated package diverter means through a first pathway through said divert switch means and back into the guide track;

(i) second pin guide means carried by said mounting means and extending from said first pin guide means to receive guide/divert pin means from said first pin guide means and to direct such guide/divert pin means and their associated package diverter means through a second pathway through said divert switch means and thereafter their cam follower means into coaction with the divert track;

(j) switch means carried by said mounting means where said second pin guide means extends from said first pin guide means and having a first disposition permitting guide/divert pin means to follow said first pathway and a second disposition preventing guide/divert pin means from following said first pathway through said divert switch means and directing the guide/divert pin means into said second pathway;

(k) switch mounting means mounting said switch means for movement in a predetermined path between said first disposition thereof and said second disposition thereof; and (l) motive means, comprising a limited angle of movement motor coacting with said switch means to move said switch means between said first disposition thereof and said second disposition thereof.

62. The sortation conveyor of claim 61, wherein said motor is operated by direct current.

63. The sortation conveyor of claim 62, wherein said motor is bi-directional.

64. The sortation conveyor of claim 63, wherein said motor is actuated with an energy pulse of a first selected amount for a selected period and thereafter held by an energy pulse of a second selected amount that is less than said first selected amount.

65. The sortation conveyor of claim 61, wherein said switch means moves in an arcuate path between said first disposition thereof and said second disposition thereof.

66. The sortation conveyor of claim 65, wherein a projection extends from said second pin guide means into a recess of said switch means.

67. The sortation conveyor of claim 61 including bumper means disposed to coact with said switch means to arrest and soften the movement thereof.

68. The sortation conveyor of claim 61, wherein the divert/guide pins are formed with a football-like cross-sectional configuration to facilitate passage through said switch means.

69. The sortation conveyor of claim 61, wherein the divert/guide pin means and cam follower means are carried by their respective package diverters so as to extend a relatively short distance therebelow.

70. The sortation conveyor of claim 61, wherein the conveying members are each of generally inverted "U" configuration each carrying a package diverter for sliding movement thereacross and wherein at least a portion of the guide/divert pin means and cam follower means carried by the package diverter extends into an opening between the legs of the "U" to provide a relatively high disposition for the guide/divert pin means and cam follower means with respect to a centerline through the conveying member.

71. A sortation conveyor; comprising:

(a) a frame means;

(b) a plurality of conveying members disposed in an interconnected endless loop on said frame means and driven by drive means to convey packages along a first conveying path from an input end of the sortation conveyor towards an output end thereof;

(c) at least a pair of divert or spur conveyor means extending from first conveying path into second and third conveying paths;

(d) each conveying path member carrying a package diverter means each including a guide/divert pin means and cam follower means extending downwardly therefrom;

(e) at least a pair of guide tracks carried by the frame means and disposed proximate opposite sides thereof to coact with guide/divert pin means to guide package diverter means associated therewith along said first conveying path;

(f) a first divert track carried by said frame means and extending at a predetermined angle from a position proximate one of said guide tracks and disposed to coact with the cam follower pin means to guide associated package diverter means to direct packages towards and onto said divert or spur conveyor means for the second conveying path;

(g) a second divert track carried by said frame means and extending from a position proximate the other guide track and disposed to coact with cam follower means to guide associated package diverter means to direct packages towards and onto the divert or spur conveyor means for the third conveying path;

(h) said first and second divert tracks crossing at a cross-over location;

(i) cross-over switch means;

(j) mounting means for mounting said cross-over switch means at said cross-over location;

(k) first cam follower guide means carried by said mounting means and disposed to coact with cam follower means from said first divert track and to direct such cam follower means and their associated package diverters through a first pathway through said cross-over switch means and back into coaction with said first divert track;

(l) second cam follower guide means carried by said mounting means and disposed to coact with cam follower means from said second divert track and to direct such cam follower means and their associated package diverters through a second pathway through said cross-over switch means and back into coaction with the second divert track;

(m) said first cam follower guide means and said second cam follower guide means intersecting at a switch location;

(n) cross-over switch means carried by said mounting means at said switch location and having a first disposition permitting cam follower means to follow said first pathway and a second disposition permitting cam follower means to follow said second pathway;

(o) cross-over switch mounting means mounting said cross-over switch means for movement in an arcuate path between said first disposition thereof and said second disposition thereof; and (p) divert mounting means for mounting each divert switch means proximate the position where the respective divert track extends from the guide track;

(q) first pin guide means carried by each said divert mounting means, disposed to receive guide/divert pin means from the respective guide track and to direct such guide/divert pin means and their associated package diverter means through a respective first pathway through said divert switch means and back into the guide track;

(r) second pin guide means carried by each said divert mounting means and extending from said first pin guide means to receive guide/divert pin means from said first pin guide means and to direct such guide/divert pin means and their associated package diverter means through a respective second pathway through said divert switch means and thereafter their cam follower means into coaction with the divert track;

(s) divert switch means carried by each said divert mounting means where said second pin guide means extends from said first pin guide means and having a first disposition permitting guide/divert pin means to follow its respective first pathway and a second disposition preventing guide/divert pin means from following said first pathway through said divert switch means and directing the guide/divert pin means into either said second or said third pathways;

(t) divert switch mounting means for mounting a respective divert switch means for movement in a predetermined path between said first disposition thereof and said second disposition thereof; and (u) divert switch motive means coacting with said divert switch means to move said divert switch means between said first disposition thereof and said second disposition thereof.

72. The sortation conveyor of claim 71, wherein said motor is operated by direct current.

73. The sortation conveyor of claim 72, wherein said motor is bi-directional.

74. The sortation conveyor of claim 73, wherein said motor is actuated with an energy pulse of a first selected amount for a selected period and thereafter held by an energy pulse of a second selected amount that is less than said first selected amount.

75. The sortation conveyor of claim 74, wherein a projection extends from said second pin guide means into a recess of said switch means.

76. The sortation conveyor of claim 75, including bumper means disposed to coact with said switch means to arrest and soften the movement thereof.

* * * * *